United States Patent [19]
Okamoto et al.

[11] Patent Number: 5,648,443
[45] Date of Patent: *Jul. 15, 1997

[54] CYCLIC OLEFIN COPOLYMERS, COMPOSITIONS AND MOLDED ARTICLES COMPRISING THE COPOLYMERS

[75] Inventors: Takuji Okamoto; Junichi Matsumoto; Masami Watanabe; Hiroshi Maezawa, all of Sodegaura, Japan

[73] Assignee: Idemitsu Kosan Co., Ltd., Tokyo, Japan

[*] Notice: The term of this patent shall not extend beyond the expiration date of Pat. No. 5,629,398.

[21] Appl. No.: 589,544

[22] Filed: Jan. 22, 1996

Related U.S. Application Data

[62] Division of Ser. No. 867,227, filed as PCT/JP91/01338, Oct. 3, 1991, Pat. No. 5,629,398.

[30] Foreign Application Priority Data

| Oct. 5, 1990 | [JP] | Japan | 2-267815 |
| Oct. 12, 1990 | [JP] | Japan | 2-274609 |
| Feb. 6, 1991 | [JP] | Japan | 3-035050 |
| Mar. 14, 1991 | [JP] | Japan | 3-073606 |
| Apr. 5, 1991 | [JP] | Japan | 3-099839 |

[51] Int. Cl.$^6$ ............ C08F 232/04; C08F 232/08; C08L 45/00
[52] U.S. Cl. ............ 526/281; 526/133; 526/134; 526/160; 526/170; 524/553; 264/331.17; 525/210
[58] Field of Search .......... 526/281, 308, 526/160, 170; 524/553, 554; 525/210, 211

[56] References Cited

U.S. PATENT DOCUMENTS 5,344,900 9/1994 Maezawa et al.
5,369,196 11/1994 Matsumoto et al.

FOREIGN PATENT DOCUMENTS 0203799 12/1986 Japan ................ 526/281

OTHER PUBLICATIONS

English Language Translation of Japanese Kokai Pat. No. 61-221206, published Oct. 1, 1986.
Tadmor et al, Principles of Polymer Processing, Wiley-Interscience, N.Y., 36–7, 1979.

*Primary Examiner*—Fred Teskin
*Attorney, Agent, or Firm*—Oblon, Spivak, McClelland, Maier & Neustadt, P.C.

[57] ABSTRACT

A process for effectively producing a cyclic olefin polymer and a cyclic olefin/alpha-olefin copolymer without opening the cyclic olefin, is disclosed. Further, a novel cyclic olefin/alpha-olefin copolymer prepared by the above-mentioned process, compositions and molded articles comprising the novel copolymer, are also disclosed. In the process for producing a cylcic olefin based polymer according to the present invention, homopolymerization of a cyclic olefin or copolymerization of a cyclic olefin and an alpha-olefin is effected in the presence of a catalyst comprising, as main ingredients, the following Compounds (A) and (B), and optionally Compound (C):

(A) a transition metal compound;
(B) a compound capable of forming an ionic complex when reacted with a transition metal compound; and
(C) an organoaluminum compound.

16 Claims, 6 Drawing Sheets

CYCLIC OLEFIN COPOLYMERS, COMPOSITIONS AND MOLDED ARTICLES COMPRISING THE COPOLYMERS

This is a Continuation of application Ser. No. 07/867,227 filed on Jun. 5, 1992, now U.S. Pat. No. 5,629,398, which was filed as International Application No. PCT/JP91/01338 ON Oct. 3, 1991.

FIELD OF THE INVENTION

The present invention relates to a process for producing a cyclic olefin based polymer, and particularly relates to a process for producing a cyclic olefin polymer and a cyclic olefin/alpha-olefin copolymer without opening rings of the cyclic olefin.

Further, the present invention relates to a novel cyclic olefin/alpha-olefin copolymer, and a composition and a molded article comprising the copolymer.

RELATED ART

It is known that cyclic olefins can be polymerized in the presence of a Ziegler-Natta catalyst. In most of the cases, the cyclic olefins suffering opening during the polymerization to give polymers with opened rings.

On the contrary to this process, cyclic olefins can be polymerized without suffering ring opening in accordance with the following methods (a) to (e).

(a) Japanese Patent Application Laid-Open Gazette (Kokai) No. Sho 64-66216 describes a process for polymerizing a cyclic olefin without suffering ring opening to obtain an isotactic polymer, in the presence of a catalyst composed of a stereo-rigid metallocene compound, particularly ethylenebis(indenyl)zirconium dichloride, and aluminoxane.

(b) Kokai No. Sho 61-271308 discloses a process for copolymerizing a cyclic olefin and an alpha-olefin without suffering ring opening, in the presence of a catalyst composed of a soluble vanadium compound and an organoaluminum compound.

(c) Kokai No. Sho 61-221206 and Kokai No. 64-106 describe a process for copolymerizing a cyclic olefin and an alpha-olefin without suffering ring opening, in the presence of a catalyst composed of a transition metal compound and aluminoxane.

(d) Kokai No. Sho 62-252406 describes a process for producing an ethylene/cyclic olefin random copolymer having an ethylene content of 40 to 90 mol % with the use of a catalyst composed of a soluble vanadium compound and an organoaluminum compound.

(e) Kokai No. Hei 3-45612 discloses a process for producing a homopolymer and a copolymer of a polycyclic olefin with the use of a catalyst composed of a specific metallocene compound and aluminoxane.

However, the polymerization processes (a), (c) and (d) require use of a great amount of aluminoxane. Thus, a substantial amount of a metal will remain in the polymerized products, resulting in deterioration and coloring of the products. In these processes, after polymerization, deashing treatment of the resultant products should be sufficiently conducted. Thus, these processes have a problem in productivity.

Further, the catalysts used in the processes (b) and (d) are inferior due to extremely poor catalytic activities. In addition, an ethylene-rich copolymer obtained by the process (d) shows clear melting point and poor random configuration. Furthermore, in Kokai No. Sho 3-45612 (Process (e)), it is not proved in the working examples that a copolymer having a cyclic olefin content of 40 mol % or more can be produced.

On the other hand, studies on olefin polymerization with use of a cationic transition metal complex, have been made since many years ago. There are many reports as indicated as follows. However, each process has some problems.

(f) Natta et al. reported that ethylene can be polymerized in the presence of a catalyst composed of titanocene dichloride and triethylaluminum (J. Polymer Sci., 26, 120 (1964). Further, Breslow et al. reported polymerization of ethylene with use of a titanocene dichloride/dimethylaluminum chloride catalyst (J. Am. Chem. Soc., 79, 5072 (1957). Furthermore, Dyachkovskii et al. suggested that polymerization activities in ethylene polymerization using a titanocene dichloride/dimethylaluminum chloride catalyst are derived from a titanocenemonomethyl cation (J. Polymer Sci., 16, 2333 (1967).

However, the ethylene activities in these processes are extremely low.

(g) Jordan et al. reported synthesis and isolation of [biscyclopentadienylzirconium methyl(tetrahydrofuran)] [tetraphenylboric acid] resulting from the reaction of zirconocenedimethyl and silver tetraphenylborate, and ethylene polymerization using the thus synthesized compound (J. Am. Chem. Soc., 108, 7410 (1986). Further, Jordan et al. synthesized and isolated [biscyclopentadienylzirconium benzyl(tetrahydrofuran)][tetraphenylboric acid] resulting from the reaction of zirconocenedibenzyl and ferrocenium tetraphenylborate (J. Am. Chem. Soc., 109, 4111 (1987).

It was confirmed that ethylene can be slightly polymerized using these catalysts, however, their polymerization activities are extremely low.

(h) Turner et al. have proposed a process for polymerizing an alpha-olefin in the presence of a catalyst comprising a metallocene compound and a boric acid complex containing a specific amine such as triethylammonium tetraphenylborate, triethylammonium tetratolylborate, and triethylammonium tetra(pentafluorophenyl)borate (Japanese Patent Application PCT Laid-Open Gazette No. Sho 1-502036).

However, in this gazette, there is no description about copolymerization of an alpha-olefin and a cyclic olefin. Further, the catalysts have extremely low polymerization activities and thus this process is not suitable for industrial use.

In addition, polymerization of a cyclic olefin is not reported in any one of the technical literature or the patent gazettes (F) to (h).

DISCLOSURE OF THE INVENTION

The present invention was made in view of the above-mentioned situations, and provides a process for producing a cyclic olefin based polymer as described below.

Production Process of Cyclic Olefin Based Polymers

The present invention provides a process for producing a cyclic olefin based polymer wherein homopolymerization of a cyclic olefin or copolymerization of a cyclic olefin and an alpha-olefin is carried out in the presence of a catalyst comprising, as main components, the following compounds (A) and (B) and optionally the following compound (C):

(A) a transition metal compound;

(B) a compound capable of forming an ionic complex when reacted with a transition metal compound; and (C) an organoaluminum compound.

The above-mentioned catalysts show excellent polymerization activities for the homopolymerization of a cyclic olefin or the copolymerization of a cyclic olefin and an alpha-olefin. In particular, the catalyst comprising the organoaluminum compound (C) shows extremely high polymerization activities with use of a small amount of an organoaluminum compound. Therefore, according to the above production process, a cyclic olefin homopolymer or an cyclic olefin/alpha-olefin copolymer can be effectively produced without ring-opening during the polymerization and without use of a great amount of an organoaluminum compound.

Further, the present invention provides the following novel cyclic olefin copolymers (I) and (II) which can be produced by, for example, the above-mentioned process.

Cyclic Olefin Copolymers (I)

The cyclic olefin copolymers (I) have a repeating unit represented by the following general formula [X]:

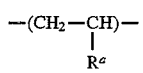
[X]

(wherein $R^a$ is a hydrogen atom or a hydrocarbon group having 1 to 20 carbon atoms); and a repeating unit represented by the following formula [Y]:

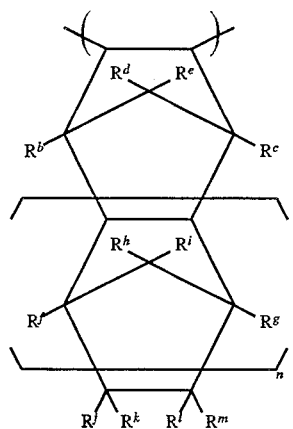
[Y]

(wherein $R^b$ to $R^m$ are independently a hydrogen atom, a hydrocarbon group having 1 to 20 carbon atoms or a substituent having a halogen atom, oxygen atom or nitrogen atom; n is an integer of at least 0; $R^j$ or $R^k$ and $R^l$ or $R^m$ may form a ring together; and $R^b$ to $R^m$ may be the same as or different from each other).

The cyclic olefin copolymers (I) have (1) 0.1 to 40 mol % of the repeating unit of the formula [X] and 60 to 99.9 mol % of the repeating unit of the formula [Y]; (2) an intrinsic viscosity [η] of 0.01 to 20 dl/g; and (3) a glass transition temperature (Tg) of 150° to 370° C.

The above cyclic olefin copolymers (I) have high content of the repeating unit based on a cyclic olefin and mainly have a vinylene structure. Thus, the copolymers are novel ones obtained for the first time by the process according to the present invention. The cyclic olefin copolymers (I) are superior in heat resistance, transparency, strength and rigidness, and can be effectively used in optical, medical and food fields.

Cyclic Olefin Copolymers (II)

Cyclic olefin copolymers (II) are those having (1) 80 to 99.9 mol % of the repeating unit of Formula [X] and 0.1 to 20 mol % of the repeating unit of Formula [Y]; (2) an intrinsic viscosity [η] of 0.01 to 20 dl/g; (3) a glass transition temperature (Tg) of less than 30° C.; and (4) a tensile modulus of less than 2,000 Kg/cm².

The above cyclic olefin copolymers (II) have low content of the repeating unit based on a cyclic olefin, and are flexible resins having physical properties different from those of polymers obtained by known catalyst systems. Thus, the copolymers are novel ones obtained for the first time by the process according to the present invention. The cyclic olefin copolymers (II) have an excellent elongation recovery property, good transparency, suitable elasity and well-balanced physical properties, and can be effectively used as films, sheets and materials for various molded articles in a variety of application fields such as wrapping, medical and agricultural fields.

Further, the present invention provides the following compositions comprising the above novel cyclic olefin copolymers (II).

Cyclic Olefin Copolymer Compositions

The present invention provides a cyclic olefin copolymer composition (First Composition) comprising the following components (a) and (b), and a cyclic olefin copolymer composition (Second Composition) comprising the following components (a), (b) and (c).

(a) 100 parts by weight of the cyclic olefin copolymer (II);

(b) 0.01 to 10 parts by weight of an anti-blocking agent and/or lubricant; and (c) 1 to 100 parts by weight of an alpha-olefin based copolymer.

The above first and second compositions exhibit good moldability in inflation molding and the like as well as a good elongation recovery property, good transparency and suitable elasity. Thus, the compositions can be suitably used as materials for films and sheets in wrapping, medical and agricultural fields.

Further, the present invention provides the following molded articles prepared .from the above-mentioned cyclic olefin copolymers or the above-mentioned cyclic olefin copolymer compositions.

Molded Article

The molded articles include, for example, films, sheets, wrapping films and those made by using a mold as indicated in the following examples (1) to (5):

(1) Films or sheets made of the cyclic olefin copolymer (I);

(2) Films or sheets made of the cyclic olefin copolymer (II);

(3) Wrapping films made of the cyclic olefin copolymer (II)

(4) Articles made using a mold from the cyclic olefin copolymer (II); and (5) Films or sheets made of the cyclic olefin copolymer composition (the first composition or the second composition).

BEST EMBODIMENTS OF THE INVENTION

The present invention will be described in more detail below.

Production Process of Cyclic Olefin Based Polymers

Figure 1:
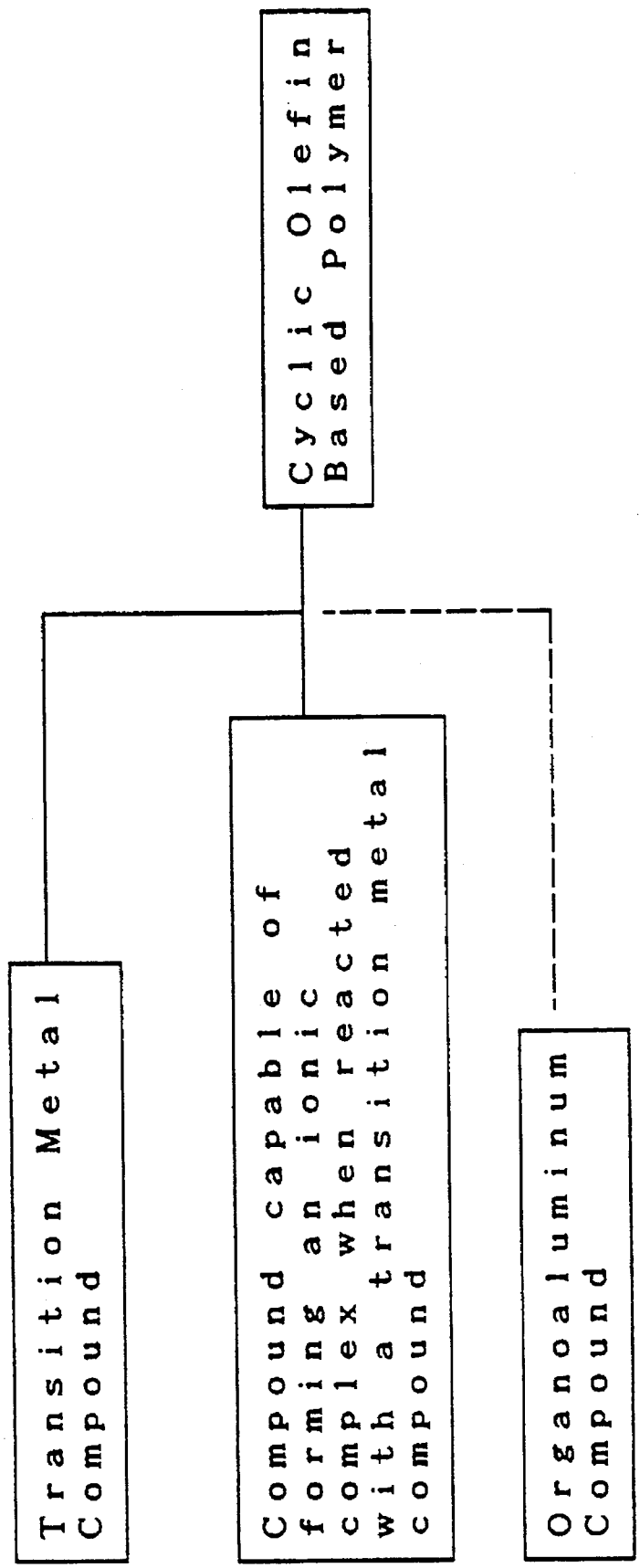
FIG. 1 shows the flowchart of the production process of the present invention.

FIG. 1 shows the production process according to the present invention.

In the process of the production of the cyclic olefin based polymers according to the present invention, transition metal compound may be used as Compound (A). The transition metal compounds include, for example, those containing at least one transition metal belonging to the IVB, VB, VIB, VIIB and VIII Groups of the Periodic Table. More specifically, as the above transition metals, preferred are titanium, zirconium, hafnium, chromium, manganese, nickel, palladium and platinum. Of these, more preferred are zirconium, hafnium, titanium, nickel and palladium.

Suitable transition metal compounds include a variety of compounds, particularly include those containing at least one transition metal belonging to the IVB and VIII Groups of the Periodic Table, more suitably a metal of the IVB Group, i.e., titanium (Ti), zirconium (Zr) or hafnium (Hf). More preferred are cyclopentadienyl compounds represented by the following formula (I), (II) or (III), or derivatives thereof, or compounds represented by the following formula (IV) or derivatives thereof.

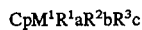  (I)

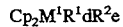  (ii)

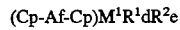  (III)

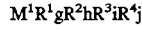  (IV)

In Formulas (I) to (IV), $M^1$ is a Ti, Zr or Hf atom; Cp is an unsaturated cyclic hydrocarbon group or chain cyclic hydrocarbon group such as a cyclopentadienyl group, substituted cyclopentadienyl group, indenyl group, substituted indenyl group, tetrahydroindenyl group, substituted tetrahydroindenyl group, fluorenyl group or substituted fluorenyl group; $R^1$, $R^2$, $R^3$ and $R^4$ are independently a ligand having a sigma bond such as a hydrogen atom, oxygen atom, halogen atom, $C_{1-20}$ alkyl group, $C_{1-20}$ alkoxy group, aryl group, alkylaryl group, $C_{6-20}$ arylalkyl group, $C_{1-20}$ acyloxy group, allyl group, substituted allyl group, a substituent containing a silicon atom, a chelate ligand or Lewis base ligand such as an acetylacetonate group and substituted acetylacetonate group; A is a bridge based on a covalent bond; a, b and c are independently an integer of 0 to 3; d and e are independently an integer of 0 to 2; f is an integer of 0 to 6; g, h, i and j are independently an integer of 0 to 4; two or more of $R^1$ and $R^2$, $R^3$ and $R^4$ may form a ring. If the above-mentioned Cp has a substituent, the substituent is preferably a $C_{1-20}$ alkyl group. In Formulas (II) and (III), two of Cp may be the same as or different from each other.

In the above Formulas (I) to (III), the substituted cycopentadienyl groups include, for example, a methylcyclopentadienyl group, ethylcyclopentadienyl group, isopropylcyclopentadienyl group, 1,2-dimethylcyclopentadienyl group, tetramethylcyclopentadienyl group, 1,3-dimethylcyclopentadienyl group, 1,2,3-trimethylcyclopentadienyl group, 1,2,4-trimethylcyclopentadienyl group, pentamethylcyclopentadienyl group, and trimethylsilylcyclopentadienyl group.

Examples of $R^1$ to $R^4$ include halogen atoms such as a fluorine atom, chlorine atom, bromine atom and iodine atom; $C_{1-20}$ alkyl groups such as a methyl group, ethyl group, n-propyl group, isopropyl group, n-butyl group, octyl group and 2-ethylhexyl group; $C_{1-20}$ alkoxy groups such as a methoxy group, ethoxy group, propoxy group, butoxy group and phenoxy group; $C_{6-20}$ aryl groups alkylaryl groups or arylalkyl group, such as a phenyl group, tolyl group, xylyl group and benzyl group; $C_{1-20}$ acyloxy groups such as a heptadecylcarbonyloxy group; substituents containing a silicon atom such as a trimethylsilyl group, (trimethylsilyl)methyl group; Lewis bases such as ethers including dimethyl ether, diethyl ether and tetrahydrofuran, thioethers including tetrahydrothiophene, esters including ethylbenzoate, nitriles including acetonitrile and benzonitrile, amines including trimethylamine, triethylamine, tributylamine, N, N-dimethylaniline, pyridine, 2,2'-bipyridine and phenanthroline, and phosphines including triethylphosphine and triphenylphosphine; chain unsaturated hydrocarbons such as ethylene, butadiene, 1-pentene, isoprene, pentadiene, 1-hexene and derivatives thereof; unsaturated cyclic hydrocarbons such as benzene, toluene, xylene, cycloheptatriene, cyclooctadiene, cyclooctatriene, cyclooctatetraene and derivatives thereof. The bridges based on a covalent bond, A include, for example, a methylene bridge, dimethylmethylene bridge, ethylene bridge, 1,1'-cyclohexylene bridge, dimethylsilylene bridge, dimethylgermanylene bridge and dimethylstannylene bridge.

More specifically, these compounds include the following compounds, and those having titanium or hafnium instead of zirconium.

Compounds of Formula (Pentamethylcyclopentadienyl)trimethylzirconium, (pentamethylcyclopentadienyl)triphenylzirconium, (pentamethylcyclopentadienyl)tribenzylzirconium, (pentamethylcyclopentadienyl)trichlorozirconium, (pentamethylcyclopentadienyl)trimethoxyzirconium, (cyclopentadienyl)trimethylzirconium, (cyclopentadienyl)triphenylzirconium, (cyclopentadienyl)tribenzylzirconium, (cyclopentadienyl)trichlorozirconium, (cyclopentadienyl)trimethoxyzirconium, (cyclopentadienyl)dimethyl(methoxy)zirconium, (methylcyclopentadienyl)trimethylzirconium, (methylcyclopentadienyl)triphenylzirconium, (methylcyclopentadienyl)tribenzylzirconium, (methylcyclopentadienyl)trichlorozirconium, (methylcyclopentadienyl)dimethyl(methoxy)zirconium, (dimethylcyclopentadienyl)trichlorozirconium, (trimethylcyclopentadienyl)trichlorozirconium, (trimethylsilylcyclopentadienyl)trimethylzirconium, (tetramethylcyclopentadienyl)trichlorozirconium, Compounds of Formula (II)

Bis(cyclopentadienyl)dimethylzirconium, bis(cyclopentadienyl)diphenylzirconium, bis (cyclopentadienyl)diethylzirconium, bis(cyclopentadienyl) dibenzylzirconium, bis(cyclopentadienyl) dimethoxyzirconium, bis(cyclopentadienyl) dichlorolzirconium, bis(cyclopentadienyl) dihydridezirconium, bis(cyclopentadienyl) monochloromonohydridezirconium, bis(methylcyclopentadienyl)dimethylzirconium, bis(methylcyclopentadienyl)dichlorozirconium, bis(methylcyclopentadienyl)dibenzylzirconium, bis(pentamethylcyclopentadienyl)dimethylzirconium, bis(pentamethylcyclopentadienyl)dichlorozirconium, bis(pentamethylcyclopentadienyl)dibenzylzirconium, bis(pentamethylcyclopentadienyl)chloromethylzirconium, bis(pentamethylcyclopentadienyl)hydridemethylzirconium, (cyclopentadienyl)(pentamethylcyclopentadienyl) dichlorozirconium.

Compounds of Formula (III)

Ethylenebis(indenyl)dimethylzirconium, ethylenebis(indenyl)dichlorozirconium, ethylenebis(tetrahydroindenyl) dimethylzirconium, ethylenebis(tetrahydroindenyl) dichlorozirconium, dimethylsilylenebis(cyclopentadienyl) dimethylzirconium, dimethylsilylenebis(cyclopentadienyl) dichlorozirconium, isopropyl(cyclopentadienyl)(9-fluorenyl)dimethylzirconium, isopropyl(cyclopentadienyl) (9-fluorenyl)dichlorozirconium, [phenyl(methyl)methylene] (9-fluorenyl)(cyclopentadienyl)dimethylzirconium, diphenylmethylene(cyclopentadienyl)(9-fluorenyl) dimethylzirconium, ethylidene(9-fluorenyl) (cyclopentadienyl)dimethylziroconium, cyclohexyl(9-fluorenyl)(cyclopentadienyl)dimethylzirconium, cyclopentyl(9-fluorenyl)(cyclopentadienyl) dimethylzirconium, cyclobutyl(9-fluorenyl) (cylcopentadienyl)dimethylzirconium, dimethylsilylene(9-fluorenyl)(cyclopentadienyl)dimethylzirconium, dimethylsilylenebis(2,3,5-trimethylcyclopentadienyl) dichlorozirconium, dimethylsilylenebis(2,3,5-trimethylcyclopentadienyl)dimethylzirconium, dimethylsilylenebis(indenyl)dichlorozirconium.

Further, compounds other than the cyclopentadienyl compound represented by Formula (I), (II) or (III) do not adversely affect the meritorious effects of the present invention. Examples of such compounds include those compounds represented by Formula (IV), such as tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, bis(2,5-di-t-butylphenoxy) dimethylzirconium, bis(2,5-di-t-butylphenoxy) dichlorozirconium, and zirconium bis(acetylacetonate). The other examples include compounds basically same as the above compounds except that zirconium is replaced with hafnium or titanium. Such compounds include zirconium compounds, hafnium compounds and titanium compounds having at least one group selected from alkyl groups, alkoxy groups and halogen atoms.

Further, the transition metal compounds containing a transition metal belonging to the VIII Group, are not particularly limited. Examples of chromium compounds include tetramethylchromium, tetra(t-butoxy)chromium, bis(cyclopentadienyl)chromium, hydridetricarbonyl(cyclopentadienyl)chromium, hexacarbonyl(cyclopentadienyl)chromium, bis(benzene)chromium, tricarbonyltris(phosphonic acid triphenyl)chromium, tris(aryl)chromium, triphenyltris(tetrahydrofuran)chromium and chromium tris(acetylacetonate).

Examples of manganese compounds include tricarbonyl(cyclopentadienyl)manganese, pentacarbonylmethylmanganese, bis(cyclopentadienyl) manganese and manganese bis(acetylacetonate).

Examples of nickel compounds include dicarbonylbis(triphenylphosphine)nickel, dibromobis(triphenylphosphine)nickel, dinitrogen bis(bis(tricyclohexylphosphine)nickel), chlorohydridebis(tricyclohexylphosphine)nickel, chloro(phenyl)bis(triphenylphosphine)nickel, dimethylbis(trimethylphosphine)nickel, diethyl(2,2'-bipyridyl)nickel, bis(allyl)nickel, bis(cyclopentadienyl)nickel, bis(methylcyclopentadienyl)nickel, bis(pentamethylcyclopentadienyl)nickel, allyl(cyclopentadienyl)nickel, (cyclopentadienyl)(cyclooctadiene)nickel tetrafluoroborate, bis(cyclooctadiene)nickel, nickel bisacetylacetonate, allylnickel chloride, tetrakis(triphenylphosphine)nickel, nickel chloride, $(C_6H_5)Ni[OC(C_6H_5)CH=P(C_6H_5)_2][P(C_6H_5)_3]$, and $(C_6H_5)Ni[OC(C_6H_5)C(SO_3Na)=P(C_6H_5)_2[P(C_6H_5)_3]$.

Examples of palladium compounds include dichlorobis(benzonitrile)palladium, carbonyltris(triphenylphosphine)palladium, dichlorobis(triethylphosphine)palladium, bis(isocyanated t-butyl)palladium, palladium bis(acetylacetonate), dichloro(tetraphenylcyclobutadiene) palladium, dichloro(1,5-cyclooctadiene)palladium, allyl(cyclopentadienyl)palladium, bis(allyl)palladium, allyl(1,5-cyclooctadiene)palladium, palladium tetrafluoroborate, (acetylacetonate)(1,5-cyclooctadiene)palladium tetrafluoroborate, and tetrakis(acetonitrile)palladium bistetrafluoroborate.

Further, Compounds (B) are not particularly limited to, but include any compounds capable of forming an ionic complex when reacted with the transition metal compound (A). The suitable compounds as Compounds (B) include a compound comprising a cation and an anion wherein a plurality of functional groups are connected to an element, particularly a coordination complex compound. The compounds comprising a cation and an anion wherein a plurality of functional groups are connected to an element, include, for example, those compounds represented by the following formula (V) or (VI):

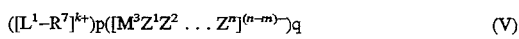  (V)

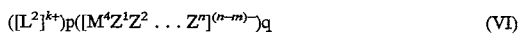  (VI)

wherein $L^2$ is $M^5$, $R^8R^9M^6$, $R^{10}{}_3C$ or $R^{11}M^6$. In Formula (V) or (VI), $L^1$ is a Lewis base; $M^3$ and $M^4$ are independently an element selected from the groups of VB, VIB, VIIB, VIII, IB, IIB, IIIA, IVA and VA of the Periodic Table; $M^5$ and $M^6$ are independently an element selected from the groups of IIIB, IVB, VB, VIB, VIIB, VIII, IA, IB, IIA, IIB and VIIA of the Periodic Table; $Z^1$ to $Z^n$ are independently a hydrogen atom, dialkylamino group, $C_{1-20}$ alkoxy group, $C_{6-20}$ aryloxy group, $C_{1-20}$ alkyl group, $C_{6-20}$ aryl group, alkylaryl group, arylalkyl group, $C_{1-20}$ halogenated hydrocarbon group, $C_{1-20}$ acyloxy group, organometalloid group or halogen atom; two or more of $Z^1$ to $Z^n$ may form a ring; $R^7$ is a hydrogen atom, $C_{1-20}$ alkyl group, $C_{6-20}$ aryl group, alkylaryl group or aryl alkyl group; $R^8$ and $R^9$ are independently a cyclopentadienyl group, substituted cyclopentadienyl group, indenyl group or fluorenyl group; $R^{10}$ is a $C_{1-20}$ alkyl group, aryl group, alkylaryl group or arylalkyl group; $R^{11}$ is a large ring ligand such as tetraphenylporphyrin and phthalocyanine; m is a valency of $M^3$ and $M^4$ and is an integer of 1 to 7; n is an integer of 2 to 8; k is an ion value number of [L¹–R⁷] and [L²], and is an integer of 1 to 7; and p is an integer of at least 1; and q is specified by the formula: q=(p×k)/(n−m).

Examples of the above Lewis bases are amines such as ammonium, methylamine, aniline, dimethylamine, diethylamine, N-methylaniline, diphenylamine, trimethylamine, triethylamine, tri-n-butylamine, N,N-dimethylaniline, methyldiphenylamine, pyridine, p-bromo-N,N-dimethylaniline and p-nitro-N,N-dimethylaniline; phosphines such as triethylphosphine, triphenylphosphine and diphenylphosphine; ethers such as dimethyl ether, diethyl ether, tetrahydrofuran and dioxane; thioethers such as diethyl thioethers and tetrahydrothiophene; and esters such as ethylbenzoate.

Examples of M³ and M⁴ are, for example, B, Al, Si, P, As and Sb. Examples of M⁵ are Li, Na, Ag, Cu, Br, I and I₃. Examples of M⁶ are Mn, Fe, Co, Ni and Zn. Examples of Z¹ to Zⁿ include dialkylamino groups such as a dimethylamino group and diethylamino group; $C_{1-20}$ alkoxy groups such as a methoxy group, ethoxy group and n-butoxy group; $C_{6-20}$ aryloxy groups such as phenoxy group, 2,6-dimethylphenoxy group and naphthyloxy group; $C_{1-20}$ alkyl groups such as a methyl group, ethyl group, n-propyl group, iso-propyl group, n-butyl group, n-octyl group and 2-ethylhexyl group; $C_{6-20}$ aryl, alkylaryl or arylalkyl groups such as a phenyl group, p-tolyl group, benzyl group, 4-t.-butylphenyl group, 2,6-dimethylphenyl group, 3,5-dimethylphenyl group, 2,4-dimethylphenyl group, 2,3-dimethylphenyl group; $C_{1-20}$ halogenated hydrocarbon groups such as p-fluorophenyl group, 3,5-difluorophenyl group, pentachlorophenyl group, 3,4,5-trifluorophenyl group, pentafluorophenyl group, 3,5-di(trifluoromethyl) phenyl group; halogen atoms such as F, Cl, Br and I; organometalloid groups such as a pentamethylantimony group; trimethylsilyl group, trimethylgermanyl group, diphenylarsine group, dicyclohexylantimony group and diphenylboron group. Examples of R⁷ and R¹⁰ are the same as above. Examples of substituted cyclopentadienyl groups represented by R⁸ and R⁹ include those substituted with an alkyl group such as a methylcyclopentadienyl group, butyl-cyclopentadienyl group and pentamethylcyclopentadienyl group. Usually, the alkyl groups have 1 to 6 carbon atoms and the number of substituted alkyl groups is an integer of 1 to 5. In Formula (V) or (VI), M³ and M⁴ are preferably boron.

Of those compounds represented by Formula (V) or (VI), the following compounds can be particularly used as preferred ones.

Compounds Represented by Formula (V)

Triethylammonium tetraphenylborate, tri(n-butyl) ammonium tetraphenylborate, trimethylammonium tetraphenylborate, tetraethylammonium tetraphenylborate, methyltri(n-butyl)ammonium tetraphenylborate, benzyltri (n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzyldimethylsulfonium tetraphenylborate, triethylammonium tetrakis(pentafluorophenyl)borate, tri(n-butyl) ammonium tetrakis(pentafluorophenyl)borate, triphenylammonium tetrakis(pentafluorophenyl)borate, tetrabutylammonium tetrakis(pentafluorophenyl)borate, tetraethylammonium tetrakis(pentafluorophenyl)borate, methyltri(n-butyl)ammonium tetrakis(pentafluorophenyl) borate, benzyltri(n-butyl)ammonium tetrakis (pentafluorophenyl)borate, methyldiphenylammonium tetrakis(pentafluorophenyl)borate, methyltriphenylammonium tetrakis(pentafluorophenyl)borate, dimethyldiphenylammonium tetrakis(pentafluorophenyl)borate, anilinium tetrakis(pentafluorophenyl)borate, methylanilinium tetrakis (pentafluorophenyl)borate, dimethylanilinium tetrakis (pentafluorophenyl)borate, trimethylanilinium tetrakis (pentafluorophenyl)borate, dimethyl(m-nitroanilinium) tetrakis(pentafluorophenyl)borate, dimethyl(p-bromoanilinium) tetrakis(pentafluorophenyl)borate, pyridinium tetrakis(pentafluorophenyl)borate, p-cyanopyridinium tetrakis(pentafluorophenyl)borate, N-methylpyridinium tetrakis(pentafluorophenyl)borate, N-benzylpyridinium tetrakis(pentafluorophenyl)borate, O-cyano-N-methylpyridinium tetrakis(pentafluorophenyl) borate, p-cyano-N-methylpyridinium tetrakis (pentafluorophenyl)borate, p-cyano-N-benzylpyridinium tetrakis(pentafluorophenyl)borate, trimethylsulfonium tetrakis(pentafluorophenyl)borate, benzyldimethylsulfonium tetrakis(pentafluorophenyl)borate, tetraphenylphosphonium tetrakis(pentafluorophenyl)borate, dimethylanilinium tetrakis(3,5-ditrifluoromethylphenyl)borate, and hexafluoroarsenic acid triethylammonium.

Compounds Represented by Formula (VI)

Ferrocenium tetraphenylborate, silver tetraphenyl borate, trityl tetraphenylborate, tetraphenylporphyrin manganese tetraphenylborate, ferrocenium tetrakis(pentafluorophenyl) borate, 1,1'-dimethylferrocenium tetrakis (pentafluorophenyl)borate, decamethylferrocenium tetrakis (pentafluorophenyl)borate, acetylferrocenium tetrakis (pentafluorophenyl)borate, formylferrocenium tetrakis (pentafluorophenyl)borate, cyanoferrocenium tetrakis (pentafluorophenyl)borate, silver tetrakis (pentafluorophenyl)borate, trityltetrakis(pentafluorophenyl) borate, lithium tetrakis(pentafluorophenyl)borate, sodium tetrakis(pentafluorophenyl)borate, tetraphenylporphyrin manganese tetra(pentafluorophenyl)borate, tetra (pentafluorophenyl)boric acid (tetraphenylporphyrin iron chloride), tetra(pentafluorophenyl)boric acid (tetraphenylporphyrin zinc), tetrafluorosilver borate, hexafluoroarsenical silver, and hexafluorosilver antimonate.

Further, compounds other than those represented by Formula (V) or (VI) such as tris(pentafluorophenyl)boron, tris (3,5-di(trifluoromethyl)phenyl)boron and triphenylboron, can be also used.

Organic aluminum compounds as Component (C) include those represented by the following formula (VII), (VIII) or (IX):

$$R^{12}{}_r AlQ_{3-r} \qquad\qquad\text{(VII)}$$

wherein $R^{12}$ is a hydrocarbon group such as an alkyl group, alkenyl group, aryl group or arylalkyl group having 1 to 20, preferably 1 to 12 carbon atoms; Q is a hydrogen atom, a $C_{1-20}$ alkoxy group or a halogen atom; and r is a number between 1 and 3.

Examples of compounds represented by Formula (VII) are, for example, trimethylaluminum, triethylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminumsesquichloride.

Chain aluminoxanes represented by the following Formula (VIII):

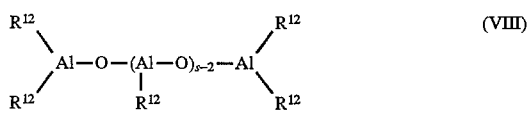

wherein $R^{12}$ is as defined in Formula (VII); and s is a degree of polymerization, usually from 3 to 50.

Cyclic alkylaluminoxanes having a repeating unit represented by the formula:

wherein $R^{12}$ is defined in Formula (VII); and s is a degree of polymerization, usually from 3 to 50.

Of these compounds represented by Formulas (VII) to (IX), preferable compounds are those represented by Formula (VII). Particularly preferable compounds are those represented by Formula (VII) wherein r is 3, more particularly, alkylaluminum such as trimethylaluminum, triethylaluminum or triisobutylaluminum.

Methods of preparing the above aluminoxanes are not particularly limited to, but include any known methods such as a process comprising contacting alkylaluminum with a condensation agent such as water. Alkylaluminum and a condensation agent can be reacted by known methods, for example, (1) a method comprising dissolving an organoaluminum compound in an organic solvent, and contacting the solution with water; (2) a method comprising adding an organoaluminum compound to starting materials for polymerization, and adding water to the reaction mixture later; (3) a method comprising reacting an organoaluminum compound with crystalline water contained in a metal salt and the like or water adsorbed to an inorganic material or an organic material; (4) a method comprising reacting tetraalkyldialuminoxane with trialkylaluminum, and then reacting the reaction product with water.

Catalysts which can be used in the process of the present invention comprise, as main ingredients, the above Component (A) and Component (B), and optionally, Component (C).

In this case, the use conditions are not limited; however it is preferable to adjust a ratio (molar ratio) of Component (A) to Component (B) to 1:0.01 to 1:100, more preferably 1:0.5 to 1:10, most preferably 1:1 to 1:5. Further, reaction temperature may preferably range from −100° to 250° C. Reaction pressure and reaction time can be appropriately selected.

Further, the amount of Component (C) used may be from 0 to 2,000 mol, preferably from 5 to 1,000 mol, most preferably from 10 to 500 mol, per 1 mol of Component (A). The use of Component (C) may improve polymerization activity. However, the use of excess amount of Component (C) is not desirable since great amount of the organoaluminum compound will remain in the resultant polymer.

In addition, a way of using the catalysts is not particularly limited. For example, it is possible that Components (A) and (B) are preliminary reacted and the reaction product is separated, washed and used for polymerization. It is also possible that Components (A) and (B) themselves are contacted in a polymerization system. Further, Component (C) can be contacted with Component (A), Component (B), or the reaction product of Component (A) and Component (B). These components can be contacted before polymerization or during polymerization. Further, these components can be added to monomers or a solvent before polymerization, or to the polymerization system.

In the process of the present invention, a cyclic olefin can be homo-polymerized, or a cyclic olefin and an alpha-olefin can be co-polymerized in the presence of the above-mentioned catalysts.

As used herein, the cyclic olefins include cyclic monoolefins having one double bond and cyclic diolefins having two double bonds.

The cyclic monolefins include, for example, monocyclic olefins such as cyclobutene, cyclopentene, cyclohexene, cycloheptene, cyclooctene; substituted monocyclic olefins such as 3-methylcyclopentene and 3-methylcyclohexene; polycyclic olefins such as norbornene, 1,2-dihydrodicyclopentadiene and 1,4,5,8-dimethano-1,2,3,4,4a,5,8,8a-octahydronaphthalene; and substituted polycyclic olefins such as 1-methylnorbornene, 5-methylnorbornene, 5-ethylnorbornene, 5-propylnorbornene, 5-phenylnorbornene, 5-benzylnorbornene, 5-ethylidenenorbornene, 5-vinylnorbornene, 5-chloronorbornene, 5-fluoronorbornene, 5-chloromethylnorbornene, 5-methoxynorbornene, 7-methylnorbornene, 5,6-dimethylnorbornene, 5,5-dichloronorbornene, 5,5,6-trimethylnorbornene, 5,5,6-trifluoro-6-trifluoromethylnorbornene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene and 2,3-dimethyl-1,4,5,8-dimethano-1,2,3,4,4a,5,8,8a-octahydronaphthalene.

Of these compounds, preferred are polycyclic olefins, particularly norbornene or derivatives thereof.

Further, the cyclic diolefins are not particularly limited to, but include norbornadienes represented by the following formula (X):

wherein $R^{13}$, $R^{14}$, $R^{15}$, $R^{16}$, $R^{17}$ and $R^{18}$ may be the same as or different from each other, and are independently a hydrogen atom, a $C_{1-20}$ alkyl group or a halogen atom.

The norbornadienes represented by the above Formula (X) include, for example, norbornadiene, 2-methyl-2,5-norbornadiene, 2-ethyl-2,5-norbornadiene, 2-propyl-2,5-norbornadiene, 2-butyl-2,5-norbornadiene, 2-pentyl-2,5-norbornadiene, 2-hexyl-2,5-norbornadiene, 2-chloro-2,5-norbornadiene, 2-bromo-2,5-norbornadiene, 2-fluoro-2,5-norbornadiene, 7,7-dimethyl-2,5-norbornadiene, 7,7-methylethyl-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 7-methyl-2,5-norbornadiene, 7-ethyl-2,5-norbornadiene, 7-propyl-2,5-norbornadiene, 7-chloro-2,5-norbornadiene, 2,3-dimethyl-2,5-norbornadiene, 1,4-dimethyl-2,5-norbornadiene and 1,2,3,4-tetramethyl-2,5-norbornadiene.

Further, suitable alpha-olefins to be co-polymerized with a cyclic olefin include, for example, those having 2 to 25 carbon atoms such as ethylene, propylene, butene-1 and 4-methylpentene-1. Of these, ethylene is most preferable.

Further, in the process of the present invention, as desired, copolymerizable unsaturated monomer components other than the above compounds, can be used. Unsaturated monomers which can be optionally copolymerized include, for example, alpha-olefins other than those listed above, cyclic olefins other than those listed above, and chain dienes such as butadiene, isoprene and 1,5-hexadiene.

As for polymerization conditions, the polymerization temperature may range from −100° to 250° C., preferably from −50° to 200° C. Further, the catalyst is preferably used in an amount to provide a starting monomer/Component (A) molar ratio or a starting monomer/Component (B) molar ratio of from 1 to $10^9$, preferably from 100 to $10^7$. The polymerization time may usually range from 1 minute to 10 hours. The reaction pressure may range from normal pressure to 100 Kg/cm$^2$G, preferably from normal pressure to 50 Kg/cm$^2$G.

Polymerization methods are not particularly limited to, but include bulk polymerization, solution polymerization and suspension polymerization.

In the case of using polymerization solvents, suitable solvents include aromatic hydrocarbons such as benzene, toluene, xylene and ethylbenzene; alicyclic hydrocarbons such as cyclopentane, cyclohexane and methylcyclohexane; aliphatic hydrocarbons such as pentane, hexane, heptane and octane; and halogenated hydrocarbons such as chloroform and dichloromethane. These solvents can be used alone or in combination. Monomers such as alpha-olefins can also be used as solvent.

The molecular weight of the resultant polymer can be controlled by appropriately selecting the amount of each catalyst component and polymerization temperature, or by a polymerization reaction in the presence of hydrogen.

In the case of preparation of cyclic olefin/alpha-olefin copolymers in accordance with the process of the present invention, substantially linear, random copolymers having a ratio of a structural unit derived from alpha-olefin to a structural unit derived from cyclic olefin, of 0.1:99.9 to 99.9 to 0.1. It is possible to confirm, by completely dissolving the resultant copolymer in decaline at 135° C., that the copolymers are substantially liner. In this case, in general, copolymers having an intrinsic viscosity of 0.01 to 20 dl/g, measured in decalin at 135° C., can be obtained.

Cyclic Olefin Copolymers (I)

The cyclic olefin copolymers (I) of the present invention have (1) 0.1 to 40 mol % of the repeating unit of the formula [X] and 60 to 99.9 mol % of the repeating unit of the formula [Y]; (2) an intrinsic viscosity of 0.01 to 20 dl/g; and (3) a glass transition temperature (Tg) of 150° to 370° C.

In the repeating unit represented by the general Formula [X], $R^a$ is a hydrogen atom or a hydrocarbon group having 1 to 20 carbon atoms.

As used herein, the hydrocarbon groups having 1 to 20 carbon atoms include, for example, a methyl group, ethyl group, isopropyl group, isobutyl group, n-butyl group, n-hexyl group, octyl group and octadecyl group.

Alpha-olefins which can provide the repeating unit represented by the general Formula [X] include, for example, ethylene, propylene, 1-butene, 3-methyl-1-butene, 4-methyl-1-pentene, 1-hexene, 1-octene, decene and eicosene.

In the repeating units represented by the general Formula [Y], $R^b$ to $R^m$ are independently a hydrogen atom, a hydrocarbon group having 1 to 20 carbon atoms, or a substituent having a halogen atom, oxygen atom or nitrogen atom.

As used herein, the hydrocarbon groups having 1 to 20 carbon atoms include, for example, alkyl groups having 1 to 20 carbon atoms such as a methyl group, ethyl group, n-propyl group, isopropyl group, n-butyl group, isobutyl group, tert.-butyl group and hexyl group; aryl groups, alkylaryl groups or arylalkyl groups having 6 to 20 carbon atoms such as a phenyl group, tolyl group and benzyl group; alkylidene groups having 1 to 20 carbon atoms such as a methylidene group, ethylidene group and propylidene group; alkenyl groups having 2 to 20 carbon atoms such as a vinyl group and allyl group. However, $R^b$, $R^c$, $R^f$ and $R^g$ cannot be an alkylidene group. In addition, if any one of $R^d$, $R^e$, and $R^h$ to $R^m$ is an alkylidene group, a carbon atom to which the alkylidene group is attached, will not have the other substituent.

Further, the halogen-containing substituents include, for example, halogen groups such as fluorine, chlorine, bromine and iodine; halogenated alkyl groups having 1 to 20 carbon atoms such as a chloromethyl group, bromomethyl group and chloroethyl group.

The oxygen-containing substituents include, for example, alkoxy groups having 1 to 20 carbon atoms such as a methoxy group, ethoxy group, propoxy group and phenoxy group; and alkoxycarbonyl groups having 1 to 20 carbon atoms such as a methoxycarbonyl group and ethoxycarbonyl group.

The nitrogen-containing substituents include, for example, alkylamino groups having 1 to 20 carbon atoms such as a dimethylamino group and diethylamino group; and cyano groups.

Examples of cyclic olefins which can provide the repeating units represented by the general Formula [Y] include: norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphthalene, 2-methyl-1,4,5,8-dimethano-1,2,3,4, 4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4, 4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2, 3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3, 4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene and 5-cyanonorbornene.

The cyclic olefin copolymers (I) of the present invention are basically composed of the above-mentioned alpha-olefin components and cyclic olefin components. However, as far as the objects of the present invention can be achieved, the other copolymerizable unsaturated monomer components can be included if desired.

Such unsaturated monomers which can be optionally copolymerized include (1) alpha-olefins which are listed before, but not used as main component; (2) cyclic olefins which are listed before, but not used as main component; (3) cyclic diolefins such as dicyclopentadiene and norbornadiene; (4) chain diolefins such as butadiene, isoprene and 1.5-hexadiene; and (5) monocyclic olefins such as cyclopentene and cycloheptene.

The cyclic olefin copolymers (I) of the present invention may have a ratio of repeating unite [X] content (x mol %) to repeating unit [Y] content (y mol %) of 0.1 to 40:99.9 to 60, preferably 0.3 to 38:99.7 to 62, most preferably 10 to 35:90 to 65. If the repeating unit [X] content is less than 0.1 mol %, the resultant copolymer will have poor flowability. If the repeating unit [X] content exceeds 40 mol %, the resultant copolymer will have insufficient heat resistance.

The cyclic olefin copolymers (I) of the present invention have an intrinsic viscosity measured at 135° C. in decaline of 0.01 to 20 dl/g. If the intrinsic viscosity is less than 0.01 dl/g, the strength of the resultant copolymer will be remarkably decreased. If the intrinsic viscosity exceeds 20 dl/g, the copolymer will have remarkably poor moldability. More preferable intrinsic viscosity may be 0.05 to 10 dl/g.

Further, the cyclic olefin copolymers (I) of the present invention have a glass transition temperature (Tg) of 150° to 370° C., preferably 160° to 350° C., most preferably 170° to 330° C. If such copolymers having glass transition temperature within these ranges are used, the resultant films or sheets can be effectively used at low temperature. The glass transition temperature (Tg) can be controlled by changing the component ratio of the copolymer and the kind of the monomers used, depending upon the intended application and required physical properties therefor.

The cyclic olefin copolymers (I) of the present invention can be composed of a copolymer having the above-mentioned physical properties and also can be composed of such copolymer and a copolymer having physical properties outside of the above ranges. In the latter case, the composition should have the physical properties within the above ranges.

Cyclic Olefin Copolymers (II)

The cyclic olefin copolymers (II) of the present invention have (1) 80 to 99.9 mol % of the repeating unit of the formula [X] and 0.1 to 20 mol % of the repeating unit of the formula [Y]; (2) an intrinsic viscosity of 0.01 to 20 dl/g; (3) a glass transition temperature (Tg) of less than 30° C.; and (4) a tensile modulus of less than 2,000 Kg/cm².

Further, as characteristic feature, the cyclic olefin copolymers (II) have a melt peak measured by DSC of less than 90° C. The cyclic olefin copolymers (II) also show a crystallization peak measured by DSC (heat down stage) such that the sub peak appears on the high temperature side against the main peak.

In the cyclic olefin copolymers (II) of the present invention, the repeating unit represented by the general Formula [X] or [Y], and unsaturated monomers which can be optionally copolymerized, are the same as those described for the cyclic olefin copolymers (I).

The cyclic olefin copolymers (II) of the present invention may have a ratio of repeating unit [X] content (x mol %) to repeating unit [Y] content (y mol %) of 80 to 99.9:20 to 0.1, preferably 82 to 99.5:18 to 0.5, most preferably 85 to 98:15 to 2. If the repeating unit [X] content is less than 80 mol %, the resultant copolymer will have high glass transition temperature and high tensile modulus, resulting in films or sheets having a poor elongation recovery property, and articles made with a mold having poor impact strength and poor elasticity. On the other hand, if the repeating unit [X] content exceeds 99.9 mol %, meritorious effects derived from introduction of the cyclic olefin component will not be satisfactory.

It is preferable that the cyclic olefin copolymers (II) be substantially linear copolymers having no gel cross-linking structure in which the repeating units [X] and [Y] are randomly arranged. It can be confirmed by complete dissolution of a copolymer in decalin at 135° C. that the copolymer does not have a gel cross-linking structure.

The cyclic olefin copolymers (II) of the present invention have an intrinsic viscosity measured in decalin at 135° C. of 0.01 to 20 dl/g. If the intrinsic viscosity is less than 0.01 dl/g, the strength of the resultant copolymer will be remarkably decreased. If the intrinsic viscosity exceeds 20 dl/g, the copolymer will have remarkably poor moldability. More preferable intrinsic viscosity may be 0.05 to 10 dl/g.

The molecular weight of the cyclic olefin copolymers (II) is not particularly limited. However, the cyclic olefin copolymers (II) have preferably a weight average molecular weight (Mw) measured by gel permeation chromatography (GPC) of 1,000 to 2,000,000, more preferably 5,000 to 1,000,000; a number average molecular weight (Mn) of 500 to 1,000,000, more preferably 2,000 to 800,000; and a molecular weight distribution (Mw/Mn) of 1.3 to 4, more preferably 1.4 to 3. Copolymers having a molecular weight distribution of greater than 4, have high content of low molecular weight components, resulting in that the resultant molded article made with a mold and films may become sticky.

The cyclic olefin copolymers (II) of the present invention have a glass transition temperature (Tg) of less than 30° C. If such copolymers having glass transition temperature within these ranges are used, the resultant films or sheets can be effectively used at low temperature. More preferred glass transition temperature (Tg) is less than 20° C., particularly less than 15° C. The glass transition temperature (Tg) can be controlled by changing the component ratio of the copolymer and the kind of the monomers used, depending upon the intended application and required physical properties therefor.

Further, the cyclic olefin copolymers (II) of the present invention preferably have a crystallization degree measured by X-ray diffractiometry of less than 40%. If the crystallization degree exceeds 40%, the elongation recovery property and transparency may be decreased.. More preferred crystallization degree is less than 30%, particularly less than 25%.

The cyclic olefin copolymers (II) of the present invention should have a tensile modulus of less than 2,000 Kg/cm². For example, if the copolymer having a tensile strength of not less than 2,000 Kg/cm² is used to prepare a film for packaging, a great amount of energy will be required during packaging and beautiful packaging corresponding to an item to be packaged cannot be obtained. If such copolymer is used to prepare an article made with a mold, the resultant product may have insufficient impact strength. More preferred impact strength is 50 to 1,500 Kg/cm².

Further, the cyclic olefin copolymers (II) of the present invention preferably show a broad melt peak measured by DSC at lower than 90° C. The copolymer having a sharp melt peak at 90° C. or higher has insufficient random arrangement of a cyclic olefin component and an alpha-olefin component, resulting in poor elongation recovery property when molded into a film or the like. In addition, the broad peak is preferably seen within a range of 10° to 85° C.

In the DSC measurement, the cyclic olefin copolymers (II) of the present invention do not exhibit a sharp melt peak. In particular, those having low crystallization degree exhibit almost no peaks at the measurement conditions for conventional polyethylene.

Further, the cyclic olefin copolymers (II) of the present invention preferably exhibit crystallization peaks measured by DSC (temperature decrease measurement) such that at least one relatively small sub peak appears on the high temperature side against the main peak.

Because of these good thermal properties in addition to the above-mentioned physical properties of the molded articles, including broad range of molding temperature, high quality molded articles such as films can be stably produced.

The cyclic olefin copolymers (II) of the present invention can be composed of a copolymer having the above-mentioned physical properties and also can be composed of such copolymer and a copolymer having physical properties outside of the above ranges. In the latter case, the composition should have the physical properties within the above ranges.

Cyclic Olefin Copolymer Compositions

The first cyclic olefin copolymer compositions comprise (a) 100 parts by weight of a cyclic olefin copolymer (II) and (b) 0.01 to 10 parts by weight of an anti-blocking agent and/or a lubricant. The second cyclic olefin copolymer compositions further comprise (c) 1 to 100 parts by weight of an alpha-olefin based polymer in addition to Components (a) and (b).

In the cyclic olefin copolymer compositions of the present invention, anti-blocking agents, Component (b) are not particularly limited to, but include, for example, oxides, fluorides, nitrides, sulfates, phosphates and carbonates of metals, and double salts thereof. More specifically, the anti-blocking agents include, for example, silicon oxide, titanium oxide, zirconium oxide, aluminum oxide, aluminosilicate, zeolite, diatomaceous earth, talc, kaolinite, sericite, montmorillonite, hectolite, calcium fluoride, magnesium fluoride, boron nitride, aluminum nitride, calcium sulfate, strontium sulfate, barium sulfate, calcium phosphate, strontium carbonate, barium phosphate, calcium carbonate, strontium carbonate and barium carbonate.

Further, lubricants which can be used as Component (b) are also not particularly limited to, but include higher aliphatic hydrocarbons, higher fatty acids, fatty acid amides, fatty acid esters, fatty acid alcohols, polyhydirc alcohols and the like. These lubricants can be used alone or in combination.

More specifically, suitable lubricants include, for example, liquid paraffin, natural paraffin polyethylene wax, fluorocarbon oil, lauric acid, palmitic acid, stearic acid, isostearic acid, hydroxylauric acid, hydroxystearic acid, oleic acid amide, lauric acid amide, erucic acid amide, methyl stearate, butyl stearate, stearyl alcohol, cetyl alcohol, isocetyl alcohol, ethylene glycol, diethylene glycol and fatty acid monoglyceride.

In addition, it is possible to use the anti-blocking agent alone, the lubricant alone or combinations thereof.

In the cyclic olefin copolymer compositions, alpha-olefin based polymers, Component (c) are homopolymers or copolymers prepared from, as one component, an alpha-olefin represented by the following general formula:

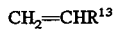
$CH_2=CHR^{13}$ wherein $R^{13}$ is a hydrogen atom or an alkyl group having 1 to 20 carbon atoms, provided that the cyclic olefin copolymers (II), the above-mentioned Component (a) are excluded.

More specifically, suitable alpha-olefin based polymers, Component (c) include, for example, polyethylene, an ethylene/1-butene copolymer, an ethylene/4-methyl-1-pentene copolymer, an ethylene/1-hexene copolymer, an ethylene/1-octene copolymer, an ethylene/vinyl acetate copolymer, an ethylene/acrylic acid copolymer, its metal salt, polypropylene, a propylene/ethylene copolymer, a propylene/1-butene copolymer, a poly-1-butene/ethylene copolymer, a 1-butene/propylene copolymer, a 1-butene/4-methyl-1-pentene copolymer, a poly-4-methyl-1-pentene, poly-3-methyl-1-butene. Of these polymers, polyethylene, an ethylene/1-butene copolymer, an ethylene/1-hexene copolymer and an ethylene/1-octene copolymer are more suitable.

The above first compositions comprise 0.01 to 10 parts by weight, preferably 0.02 to 8 parts by weight, more preferably 0.05 to 5 parts by weight of an anti-blocking agent and/or a lubricant, Component (b), based on 100 parts by weight of the cyclic olefin copolymer (II), Component (a).

The above second composition further comprise 1 to 100, preferably 2 to 80, more preferably 3 to 50 parts by weight of an alpha-olefin based polymer, Component (c), based on 100 parts by weight of the cyclic olefin copolymer (II), Component (a) in addition to the anti-blocking agent and/or the lubricant, Component (b). In the second compositions, the addition of the alpha-olefin based polymer, Component (c) can make it possible to reduce the amount of Component (b) used and can also solve problems such as bleeding out.

In the first and second compositions, if the amount of Component (b) added is less than 0.01 parts by weight, the compositions will have too large adhesiveness, resulting in poor moldability. If the amount exceeds 10 parts by weight, the transparency will be decreased.

Further, in the second compositions, if the amount of Component (c) added is less than 1 part by weight, the meritorious effects derived from addition of the alpha-olefin polymer cannot be expected. If the amount exceeds 100 parts by weight, the elongation recovery property will be insufficient. In addition, the cyclic olefin copolymer compositions of the present invention may comprise the other additives such as stabilizers such as an antioxidant and UV-absorbant, antistatic agent, inorganic or organic filler, dye, pigment and the like.

There is no specific limitation to a production process of the cyclic olefin copolymer compositions of the present invention. However, the compositions can be effectively produced by mixing each of components in a molten state. Conventional melt-mixing machines which can be used include, for example, open type ones such as a mixing roll and closed type ones such as a Bunbury mixer, extruder, kneader, continuous mixer and the like.

In addition, it is also preferable to add additives such as Component (b) to the compositions, by preliminarily add such additives to a cyclic olefin copolymer or an alpha-olefin based resin to prepare a master batch.

Molded Articles

The cyclic olefin copolymers (I) and (II), and the cyclic olefin copolymer compositions of the present invention can be molded into films, sheets and other various molded articles by known methods. For example, the cyclic olefin copolymers or compositions can be subjected to extrusion molding, injection molding, blow molding or rotation molding with use of a uniaxial extruder, vent type extruder, biaxial screw extruder, biaxial conical screw extruder, cokneader, pratificater, mixtruder, planetary screw extruder, gear type extruder, screwless extruder or the like. Further, films and sheets can be produced by a T-die method, inflation method or the like.

In addition, the cyclic olefin copolymer compositions of the present invention can be directly subjected to processing during the production of the composition if necessary. In the practice of processing, known additives such as heat stabilizer, light stabilizer, antistatic agent, slipping agent, anti-blocking agent, deodorant, lubricant, synthesized oil, natural oil, inorganic or organic filler, dye and pigment, can be added if desired.

The films or sheets obtained from the cyclic olefin copolymers (I) of the present invention as described above are superior in heat resistance, transparency, strength and hardness, and thus can be effectively used in an optical, medical, and food field or the like.

The films or sheets made form the cyclic olefin copolymers (II) of the present invention have a good elongation recovery property, good transparency, suitable elasticity and well-balanced physical properties, and thus can be effectively used in a packaging, medical, agricultural field or the like.

Further, the wrapping films made of the cyclic olefin copolymers (II) of the present invention are superior in various properties such as transparency, an elongation recovery property, adhesiveness, a tensile property, stabbing strength, tear strength, low temperature heat sealability. The wrapping films have no problems from a food sanitary view point and from a waste incineration view point, and thus are pollutionless products.

Furthermore, the molded articles made with a mold from the cyclic olefin copolymers (II) have good transparency, elasticity and impact strength, and thus can be used as various products such as automotive parts, parts for home electronics appliances, electric wire coating parts, goods or materials for construction.

EXAMPLES

The present invention will be described in more detail with reference to the following Examples and Comparative Examples, which are not construed as limiting.

In the Examples and Comparative Examples, physical properties were measured as follows.

Mw, Mn, Mw/Mn

In Examples 1 to 73, the weight average molecular weight (Mw), number average molecular weight (Mn) and molecular weight distribution (Mw/Mn) were measured with GPC-880 manufactured by Nihon Bunkoh (column: TSK GMH-6X 1 manufactured by Tosoh; GL-A120 X 1 and GL-A130 X 1 manufactured by Hitachi) under the following conditions:

Solvent: Chloroform
Temperature: 23° C.
Standard Polymer: Polystyrene.

In the other Examples and Comparative Examples, Mw, Mn, and Mw/Mn were measured with ALC/GPC-150C manufactured by Waters (column: TSK GMH-6 X 2 manufactured by Tosoh) under the following conditions:

Solvent: 1,2,4-trichlorobenzene
Temperature: 135° C.
Standard Polymer: Polyethylene.

Intrinsic Viscosity [η]

The intrinsic viscosity was measured in decalin at 135° C.

Norbornene Content

The norbornene content was calculated from a ratio of the sum of a peak measured by $^{13}$C-NMR appearing at 30 ppm and derived from ethylene and a peak derived from a methylene group in the 5th and 6th positions of the norbornene; to a peak appearing at 32.5 ppm and derived from a methylene group in the 7th position of the norbornene.

Degree of Crystallization

A specimen was prepared by heat pressing. The specimen was evaluated at room temperature by X-ray diffractiometry.

Glass Transition Temperature (TG)

As a measurment equipment, VIBRON II-EA manufactured by Toyo Bowlding was used. A specimen having a width of 4 mm, a length of 40 mm and a thickness of 0.1 mm was evaluated at a heat up rate of 3° C./min. and at a frequency of 3.5 Hz. The glass transition temperature was calculated from the peak of the loss modulus (E") measured in the above manner.

Softening Point (TMA)

A copolymer was heated to 250° C. to prepare a press sheet having a thickness of 0.1 mm. A specimen was cut out of the press sheet, and evaluated for softening point (TMA). The TMA is the temperature when the specimen was torn off by heating the specimen at a heat up rate of 10° C./min while a load of 3 g/mm$^2$ was applied to the specimen. The TMA was measured by TMA-100 manufactured by Seiko Electronics.

Melting Point (Tm)

The melting point was measured with DSC (7 series manufactured by Perkin-Elmer) at a heat up rate of 10° C./min. The melting point was measured at between −50° C. and 150° C.

Crystallization Temperature

The crystallization temperature was measured by heating a specimen with DSC (7 series manufactured by Perkin-Elmar) at a heat up rate of 10° C./min. up to 150° C., keeping it for 60 seconds, and then cooling it at a heat down rate of 10° C./min. up to −50° C.

Tensile Modulus

The tensile modulus was measured with an autograph in accordance with JIS-K7113.

Tensile Strength at Break

The tensile strength at break was measured with an autograph in accordance with JIS-K7113.

Elongation at Break

The elongation at break was measured with an autograph in accordance with JIS-K7113.

Elastic Recovery

A specimen having a width of 6 mm and a length between clamps (L$^0$) of 50 mm, was extended up to 150% with an autograph at a pulling rate of 62 mm/min., and kept for 5 minutes. Then, the specimen was allowed to shrink without rebounding. One minute later, the length between clamps ($L^1$) was measured. The elastic recovery was calculated in accordance with the following equation.

Elastic Recovery=$[1-\{(L_1-L^0)/L^0\}] \times 100$

In this case, preferable elongation recovery rate may be at least 10%, more preferably at least 30%, most preferably at least 60%.

All Light Transmittance, Haze

The all light transmittance and haze were measured with a digital haze computer manufactured by Suga Testing Equipment in accordance with JIS-K7105.

Heat Seal Temperature

A specimen (4 cm×20 cm) was heat sealed by pressing the heat seal portion (10 mm×15 mm) at a pressure of 2 Kg/cm$^2$ for one second. Thirty minutes later, the specimen was pulled to separate the heat seal portion at a pulling rate of 200 mm/min until the heat seal was broken. The heat seal temperature was the temperature when the strength to pull the specimen reached 300 g.

Elemendorf Tear Strength

The Elemendorf tear strength was measured in accordance with JIS-P8116.

Self Adhesiveness

The self adhesiveness was evaluated by observing if the films pressed together was separated after a certain period of time.

Stabbing Strength

The load when a specimen was stabbed with a needle having a tip radius of 0.5 mm at a stabbing rate of 50 mm/min., was measured.

Izod Impact Strength

The izod impact Strength was measured in accordance with JIS-K7110.

Molding Shrinkage Factor

Injection molding was carried out with a mold (70 mm×70 mm×20 mm) to prepare a molded article. After the molded article was allowed to stand at 23° C. for 24 hours, the shrinkage factor was measured by comparing the size of the molded article with the size of the mold.

Gas Permeability

The gas permeability was measured at 23° C. in accordance with Process A (differential pressure process) of JIS-K7126.

Moisture Permeability

The moisture permeability was measured at 40° C. at a comparative moisture of 90% in accordance with the cup process (Conditions B) of JIS-Z0208.

Olsen Stiffness

The olsen stiffness was measured in accordance with JIS-K7106.

Shore Hardness

The shore hardness was measured in accordance with JIS-K7215.

Example 1

(1) Preparation of Triethylammonium Tetrakis (pentafluorophenyl)borate:

Pentafluorophenyllithium prepared from bromopentafluorobenzene (152 mmol) and butyllithium (152 mmol), was reacted with 45 mmol of boron trichlorode in hexane to obtain tris(pentafluorophenyl)boron as a white solid product. The obtained tris(pentafluorophenyl)boron (41 mmol) was reacted with pentafluorophenyllithium (41 mmol) to isolate lithium tetrakis(pentafluorophenyl)borate as a white solid product.

Further, lithium tetrakis(pentafluorophenyl)borate (16 mmol) was reacted with triethylamine hydrochloride (16 mmol) in water to obtain 12.8 mmol of triethylammonium tetrakis(pentafluorophenyl)borate as a white solid product.

It was confirmed by $^1$H-NMR and $^{13}$C-NMR that the reaction product was the target product.

$^1$H-NMR (THFd$_8$):
—CH$_3$ 1.31 ppm
—CH$_2$— 3.27 ppm
$^{13}$C-NMR:
—C$_6$F$_5$ 150.7, 147.5, 140.7, 138.7, 137.4, 133.5 ppm
—CH$_2$— 48.2 ppm
—CH$_3$ 9.1 ppm (2) Preparation of Catalyst:

One milimol of (cyclopentadienyl)trimethylzirconium was reacted with 1 mmol of triethylammonium tetrakis (pentafluorophenyl)borate in 50 ml of toluene at room temperature for four hours. After the solvent was removed, the obtained solid product was washed with 20 ml of petroleum ether, dried and dissolved in 50 ml of toluene to obtain a catalyst solution.

(3) Polymerization:

A 100 ml flask was charged with 25 mmol of cyclopentene, 0.05 mmol of the catalyst (as transition metal component), and 25 ml of toluene. Then, the reaction was carried out at 20° C. for 4 hours. The reaction product was placed into methanol and the precipitated white solid product was recovered by filtration. Then, the obtained product was washed with methanol and dried. The yield was 0.61 g.

The polymerization activity was 0.13 Kg/gZr (12 Kg/mol-Zr). As a result of molecular weight measurement by GPC, it was found that the obtained product had a Mw of 8,200 and a Mw/Mn of 2.6.

Further, it was found by $^1$H-NMR that the obtained product did not show absorption derived from a carbon-carbon double bond at 5.7 ppm, and by infrared spectrophotometry that the obtained product was polymerized with keeping the rings therein.

Example 2

In a 100 ml flask, 25 mmol of cyclopentene, 0.05 mmol of (cyclopentadienyl)tribenzylzirconium, and 0.05 mmol of triethylammonium tetrakis(pentafluorophenyl)borate were reacted in 50 ml of toluene at 20° C. for 4 hours. Thereafter, the reaction mixture was placed into 100 ml of methanol and the precipitated white solid product was recovered by filtration. Then, the obtained product was washed with 50 ml of methanol, and dried under reduced pressure to obtain 0.58 g of white powders.

The polymerization activity was 0.13 Kg/gZr (12 Kg/mol-Zr). As a result of molecular weight measurement by GPC, it was found that the obtained product had a Mw of 9,400 and a Mw/Mn of 2.6.

Example 3

In a 100 ml flask, 25 mmol of norbornene (in a 70 wt. % norbornene solution containing the same solvent as that for polymerization; this procedure will follow throughout the examples and comparative examples as described below), 0.05 mmol of (pentamethylcyclopentadienyl) trimethylzirconium, and 0.05 mmol of triethylammonium tetrakis(pentafluorophenyl)borate were reacted, while stirring, in 50 ml of toluene at 20° C. for 4 hours. Thereafter, the reaction mixture was placed into 100 ml of methanol. A white solid product was precipitated, recovered by filtration, and then dried to obtain 0.51 g of a solid product.

The polymerization activity was 0.11 Kg/gZr (10 Kg/mol-Zr). As a result of molecular weight measurement by GPC, it was found that the obtained product had a Mw of 12,000 and a Mw/Mn of 2.3.

Example 4

To a 500 ml glass vessel, 200 ml of dried toluene and 21 mmol of norbornene were charged and ethylene gas was purged at 50° C. for 10 minutes. Thereafter, 0.05 mmol of bis(cyclopentadienyl)dimethylzirconium, and 0.05 mmol of triethylammonium tetrakis(pentafluorophenyl)borate were added to the reaction vessel to initiate the polymerization. After the polymerization was carried out at 50° C. for 1 hour, the polymerization was terminated by addition of methanol. The reaction product was recovered by filtration, and dried to obtain 1.8 g of a copolymer.

The polymerization activity was 0.39 Kg/gZr (36 Kg/mol-Zr). The obtained product had an intrinsic viscosity of 1.38 dl/g and a norbornene content of 12 mol %.

Example 5

(1) Preparation of Catalyst:

One millimole of ethylenebis(indenyl)dimethylzirconium was reacted with 1 mmol of triethylammonium tetrakis (pentafluorophenyl)borate in 50 ml of toluene at 20° C. for 4 hours. After the solvent was removed, the obtained solid product was washed with 20 ml of petroleum ether, dried and dissolved in 50 ml of toluene to obtain a catalyst solution.

(2) Polymerization:

A 100 ml flask was charged with 25 mmol of cyclopentene, 0.05 mmol of the catalyst (as transition metal component), and 25 ml of toluene. Then, the reaction mixture was reacted at 20° C. for 4 hours. The reaction product was placed into methanol and the precipitated white solid product was recovered by filtration to obtain 0.84 g of a white solid product.

The polymerization activity was 0.18 Kg/gZr (16.8 Kg/mol-Zr). As a result of molecular weight measurement by GPC, it was found that the obtained product had a Mw of 7,800 and a Mw/Mn of 2.8.

Further, it was found by $^1$H-NMR that the obtained product did not show absorption derived from a carbon-carbon double bond at 5.7 ppm, and by infrared spectrophotometry that the obtained product was polymerized with keeping the rings therein.

Example 6

In a 100 ml flask, 25 mmol of cyclopentene, 0.05 mmol of ethylenebis(indenyl)dimethylzirconium, and 0.05 mmol of triethylammonium tetrakis(pentafluorophenyl)borate were reacted in 50 ml of toluene. After the reaction was carried out at 20° C. for 4 hours, the reaction product was placed into 100 ml of methanol. The precipitated white solid product was recovered by filtration, washed with 50 ml of methanol, and dried under reduced pressure to obtain 0.63 g of white solid powders.

The polymerization activity was 0.14 Kg/gZr (12.6 Kg/mol-Zr). As a result of molecular weight measurement by GPC, it was found that the obtained product had a Mw of 9,000 and a Mw/Mn of 2.7.

Example 7

In a 100 ml flask, 25 mmol of norbornene, 0.05 mmol of ethylenebis(indenyl)dimethylzirconium, and 0.05 mmol of triethylammonium tetrakis(pentafluorophenyl)borate were reacted in 50 ml of toluene. After, the reaction was carried out, while stirring, at 20° C. for 4 hours, the reaction mixture was placed into 100 ml of methanol. A white solid product was precipitated, recovered by filtration, and dried to obtain 0.49 g of a solid product.

The polymerization activity was 0.11 Kg/gZr (9.8 Kg/mol-Zr). As a result of molecular weight measurement by GPC, it was found that the obtained product had a Mw of 10,500 and a Mw/Mn of 2.1.

Example 8

The procedures of Example 7 were repeated except that ferrocenium tetrakis(pentafluorophenyl)borate was used instead of triethylammoniumtetrakis(pentafluorophenyl) borate. The yield was 0.82 g.

The polymerization activity was 0.18 Kg/gZr (16.4 Kg/mol-Zr). As a result of molecular weight measurement by GPC, it was found that the obtained product had a Mw of 9,800 and a Mw/Mn of 2.6.

Example 9

The procedures of Example 7 were repeated except that silver tetrakis(pentafluorophenyl)borate was used instead of triethylammonium tetrakis(pentafluorophenyl)borate. The yield was 0.56 g.

The polymerization activity was 0.12 Kg/gZr (11.2 Kg/mol-Zr). As a result of molecular weight measurement by GPC, it was found that the obtained product had a Mw of 8,900 and a Mw/Mn of 2.4.

Example 10

The procedures of Example 7 were repeated except that trityl tetrakis(pentafluorophenyl)borate was used instead of triethylammonium tetrakis(pentafluorophenyl)borate. The yield was 0.64 g.

The polymerization activity was 0.14 Kg/gZr (12.8 Kg/mol-Zr). As a result of molecular weight measurement by GPC, it was found that the obtained product had a Mw of 9,100 and a Mw/Mn of 2.3.

Example 11

A glass vessel purged with argon, was charged with 100 ml of toluene, 25 mmol of cyclopentene, 0.01 mmol of triethylammonium tetrakis(pentafluorophenyl)borate, 0.2 mmol of triisobutylaluminum and 0.01 mmol of ethylenebis (indenyl) dimethylzirconium. The reaction was carried out at 20° C. for 1 hour, and terminated by placing the reaction mixture into methanol. The white solid product was recovered by filtration, and dried to obtain 0.85 g of a white solid product.

The polymerization activity was 0.93 Kg/gZr (85 Kg/mol-Zr). As a result of molecular weight measurement by GPC, it was found that the obtained product had a Mw of 11,000 and a Mw/Mn of 2.3.

Example 12

To a 500 ml glass vessel, 200 ml of dried toluene and 25 mmol of norbornene were charged and ethylene gas was purged at 50° C. for 10 minutes. Thereafter, 0.01 mmol of ethylenebis(indenyl)dimethylzirconium and 0.01 mmol of triethylammonium tetrakis(pentafluorophenyl)borate were added to the reaction vessel to initiate the polymerization. After the polymerization was carried out at 50° C. for 1 hour, the polymerization was terminated by addition of methanol. The reaction product was recovered by filtration, and dried to obtain 2.1 g of a copolymer.

The polymerization activity was 2.3 Kg/gZr (210 Kg/mol-Zr). The obtained product had an intrinsic viscosity of 1.40 dl/g and a norbornene content of 10 mol %.

Example 13

To a 500 ml glass flask, 200 ml of dried toluene, 21 mmol of norbornene, 0.2 mmol of triisobutylaluminum, 0.01 mmol of ethylenebis(indenyl)dimethylzirconium, and 0.01 mmol of triethylammonium tetrakis(pentafluorophenyl)borate were charged and kept at 50° C. for 10 minutes. Thereafter, the polymerization was carried out for 1 hour while introducing ethylene gas. The polymerization was terminated by addition of methanol. The obtained copolymer was recovered by filtration, and dried to obtain 6.3 g of a solid product.

The polymerization activity was 6.9 Kg/gZr (630 Kg/mol-Zr). The obtained product had an intrinsic viscosity of 2.15 dl/g and a norbornene content of 8 mol %.

Example 14

To a 500 ml glass vessel, 200 ml of dried toluene and 25 mmol of norbornene were charged and ethylene gas was purged at 50° C. for 10 minutes. Thereafter, 0.05 mmol of dimethylsilylenebis(cyclopentadienyl)dimethylzirconium, and 0.05 mmol of triethylammonium tetrakis (pentafluorophenyl)borate were added to the reaction vessel to initiate the polymerization. After the polymerization was carried out at 50° C. for 1 hour, the polymerization was terminated by addition of methanol. The reaction product was recovered by filtration, and dried to obtain 4.0 g of a copolymer.

The polymerization activity was 0.88 Kg/gZr (80 Kg/mol-Zr). The obtained product had an intrinsic viscosity of 1.36 dl/g and a norbornene content of 38 mol %.

Comparative Example 1

A glass vessel purged with argon, was charged with 100 ml of toluene, 25 mmol of cyclopentene, 0.2 mmol of aluminoxane and 0.05 mmol of ethylenebis(indenyl) dichlorozirconium. The reaction was carried out at 20° C. for 1 hour, but a polymer was not obtained.

Comparative Example 2

To a 500 ml glass vessel, 200 ml of dried toluene and 21 mmol of norbornene were charged and ethylene gas was purged at 50° C. for 10 minutes. Thereafter, 0.2 mmol of aluminoxane and $1.25 \times 10^{-2}$ mol of bis(cyclopentadienyl) dichlorozirconium were added to the reaction vessel to initiate the polymerization. The polymerization was carried out at 20° C. for 1 hour, but a polymer was not obtained.

Comparative Example 3

A 500 ml glass flask was charged with 200 ml of dried toluene and 21 mmol of norbornene. To the flask, 0.2 mmol of aluminoxane and 0.01 mmol of dimethylsilylenebis (cylcopentadienyl)dichlorozirconium were further added, and the reaction mixture was kept at 50° C. for 10 minutes. Thereafter, the polymerization was carried out for 1 hour while introducing ethylene gas, but a polymer was not obtained.

Example 15

(1) Synthesis of $[Cp_2Fe][B(C_6F_5)_4]$ (in accordance with techniques described in Jolly, W. L. The Synthesis and Characterization of Inorganic Compounds; Prentice-Hall: Englewood Cliffs, N.J., 1970, P487):

Ferrocene (3.7 g, 20.0 mmol) was reacted with 40 ml of concentrated sulfuric acid at room temperature for one hour to obtain very dark blue solution. The obtained solution was placed in 1 liter of water with agitation to obtain slightly dark blue solution. The obtained solution was added to 500 ml of an aqueous solution of $Li[B(C_6F_5)_4]$ (13.7 g, 20.0 mmol: Synthesized in accordance with a process described in J. Organometal. Chem., 2 (1964) 245). The light blue precipitate was taken by filtration and then washed with 500 ml of water five times. Then, the washed product was dried under reduced pressure to obtain 14.7 g (17 mmol) of the target product, [ferrocenium tetrakis(pentafluorophenyl) borate.

(2) Polymerization:

A 1 liter autoclave was charged with 400 ml of dried toluene, 0.05 mmol of ferrocenium tetrakis (pentafluorophenyl)borate, 0.05 mmol of bis (cyclopentadienyl)dimethylzirconium and 100 mmol of norbornene. Then, the polymerization was carried out at 50° C. at an ethylene pressure of 5 Kg/cm² for 4 hours to obtain 5.3 g of a copolymer. The polymerization activity was 1.2 Kg/gZr.

The obtained copolymer had a norbornene content of 2 mol %; an intrinsic viscosity of 2.24 dl/g; and a crystallization degree of 8%.

Example 16

A 1 liter autoclave was charged with 400 ml of dried toluene, 0.6 mmol of triisobutylaluminum, 0.03 mmol of ferrocenium tetrakis(pentafluorophenyl)borate, 0.03 mmol of bis(cyclopentadienyl)dimethylzirconium and 200 mmol of norbornene. Then, the polymerization was carried out at 50° C. at an ethylene pressure of 5 Kg/cm² for 0.5 hours, and terminated by addition of methanol. The reaction product was recovered by filtration, and dried to obtain 71 g of a copolymer. The polymerization activity was 26 Kg/gZr.

The obtained copolymer had a norbornene content of 7 mol %; an intrinsic viscosity of 2.10 dl/g; and a crystallization degree of 6%.

Example 17

The procedures of Example 16 were repeated except that 1,1'-dimethylferrocenium tetrakis(pentafluorophenyl)borate was used instead of ferrocenium tetrakis(pentafluorophenyl) borate. As a result, 64 g of a copolymer were obtained. The polymerization activity was 23 Kg/gZr.

The obtained copolymer had a norbornene content of 7 mol %; an intrinsic viscosity of 1.72 dl/g; and a crystallization degree of 7%.

Example 18

The procedures of Example 16 were repeated except that dimethylanilinium tetrakis(pentafluorophenyl)borate was used instead of ferrocenium tetrakis(pentafluorophenyl) borate, and the polymerization temperature was changed to 4 hours. As a result, 30 g of a copolymer were obtained. The polymerization activity was 11 Kg/gZr.

The obtained copolymer had a norbornene content of 7 mol %; an intrinsic viscosity of 1.54 dl/g; and a crystallization degree of 8%.

Example 19

A 1 liter autoclave was charged with 400 ml of dried toluene, 0.4 mmol of triisobutylaluminum, 0.02 mmol of 1,1'-dimethylferrocenium tetrakis(pentafluorophenyl) borate, 0.02 mmol of bis(cyclopentadienyl) dimethylzirconium and 260 mmol of norbornene. Then, the polymerization was carried out at 50° C. at an ethylene pressure of 5 Kg/cm$^2$ for 1 hour, to obtain 95 g of a copolymer. The polymerization activity was 52 Kg/gZr;

The obtained copolymer had a norbornene content of 7 mol %; an intrinsic viscosity of 1.69 dl/g; and a crystallization degree of 7%.

Example 20

The procedures of Example 16 were repeated except that the amount of norbornene added was changed to 250 mmol, and the polymerization temperature was changed to 70° C. As a result, 105 g of a copolymer were obtained. The polymerization activity was 38 Kg/gZr.

The obtained copolymer had a norbornene content of 5 mol %; an intrinsic viscosity of 2.15 dl/g; and a crystallization degree of 8%.

Example 21

The procedures of Example 20 were repeated except that the amount of norbornene added was changed to 350 mmol. As a result, 63 g of a copolymer were obtained. The polymerization activity was 23 Kg/gZr.

The obtained copolymer had a norbornene content of 10 mol %; an intrinsic viscosity of 1.89 dl/g; and a crystallization degree of 5%.

Example 22

The procedures of Example 16 were repeated except that bis(pentamethylcyclopentadienyl)dimethylzirconium was used instead of bis(cyclopentadienyl)dimethylzirconium, and the polymerization time was changed to 4 hours. As a result, 85 g of a copolymer were obtained. The polymerization activity was 31 Kg/gZr.

The obtained copolymer had a norbornene content of 4 mol %; an intrinsic viscosity of 2.32 dl/g; and a crystallization degree of 9%.

Example 23

The procedures of Example 16 were repeated except that bis(cyclopentadienyl)dimethylhafnium was used instead of bis(cyclopentadienyl)dimethylzirconium. As a result, 53 g of a copolymer were obtained. The polymerization activity was 10 Kg/gZr.

The obtained copolymer had a norbornene content of 7 mol %; an intrinsic viscosity of 1.77 dl/g; and a crystallization degree of 7%.

Example 24

The procedures of Example 16 were repeated except that bis(cyclopentadienyl)dibenzylzirconium was used instead of bis(cyclopentadienyl)dimethylzirconium. As a result, 74 g of a copolymer were obtained. The polymerization activity wa 27 Kg/gZr.

The obtained copolymer had a norbornene content of 6 mol %; an intrinsic viscosity of 1.85 dl/g; and a crystallization degree of 8%.

Example 25

The procedures of Example 22 were repeated except that dimethylsilylenebis(cyclopentadienyl)dimethylzirconium was used instead of bis(pentamethylcyclopentadienyl) dimethylzirconium. As a result, 39 g of a copolymer were obtained. The polymerization activity was 14 Kg/gZr.

The obtained copolymer had a norbornene content of 72 mol %; an intrinsic viscosity of 2.11 dl/g; and a crystallization degree of 0%.

Comparative Example 4

The procedures of Example 15 were repeated except that ferrocenium tetrakis(pentafluorophenyl)borate was not used. As a result, a polymer was not obtained.

Comparative Example 5

The procedures of Example 15 were repeated except that bis(cyclopentadienyl)dimethylzirconium was not used. As a result, a polymer was not obtained.

Example 26

The procedures of Example 16 were repeated except that bis(cyclopentadienyl)dimethoxyzirconium was used instead of bis(cyclopentadienyl)dimethylzirconium. As a result, 46 g of a copolymer were obtained. The polymerization activity was 17 Kg/gZr.

The obtained copolymer had a norbornene content of 7 mol %; an intrinsic viscosity of 2.74 dl/g; and a crystallization degree of 6%.

Example 27

A 1 liter autoclave was charged with 400 ml of dried toluene, 0.6 mmol of triisobutylaluminum and 0.015 mmol of bis(cyclopentadienyl)dichlorozirconium. After agitation, 0.045 mmol of ferrocenium tetrakis(pentafluorophenyl) borate and 200 mmol of norbornene were added to the reaction mixture. The polymerization was carried out at 50° C. at an ethylene pressure of 5 Kg/cm$^2$ for 0.5 hours, to obtain 65 g of a copolymer. The polymerization activity was 48 Kg/gZr.

The obtained copolymer had a norbornene content of 8 mol %; an intrinsic viscosity of 2.30 dl/g; and a crystallization degree of 5%.

Example 28

The procedures of Example 24 were repeated except that bis(cyclopentadienyl)dibenzylzirconium and ferrocenium tetrakis(pentafluoropheny)borate were used in an amount of 0.015 mmol, respectively. As a result, 84 g of a copolymer were obtained. The polymerization activity was 62 Kg/gZr.

The obtained copolymer had a norbornene content of 6 mol %; an intrinsic viscosity of 2.13 dl/g; and a crystallization degree of 6%.

Example 29

The procedures of Example 27 were repeated except that bis(cyclopentadienyl)monochloromonohydridezirconium was used instead of bis(cyclopentadienyl) dichlorozirconium. As a result, 62 g of a copolymer were obtained. The polymerization activity was 45 Kg/gZr.

The obtained copolymer had a norbornene content of 8 mol %; an intrinsic viscosity of 2.34 dl/g; and a crystallization degree of 5%.

Example 30

The procedures of Example 16 were repeated except that (cyclopentadienyl)trimethylzirconium was used instead of bis(cyclopentadienyl)dimethylzirconium. As a result, 68 g of a copolymer were obtained. The polymerization activity was 25 Kg/gZr.

The obtained copolymer had a norbornene content of 7 mol %; an intrinsic viscosity of 2.22 dl/g; and a crystallization degree of 6%.

Example 31

The procedures of Example 22 were repeated except that tetrabenzylzirconium was used instead of bis(pentamethylcyclopentadienyl)dimethylzirconium. As a result, 50 g of a copolymer were obtained. The polymerization activity was 18 Kg/gZr.

The obtained copolymer had a norbornene content of 6 mol %; an intrinsic viscosity of 2.50 dl/g; and a crystallization degree of 8%.

Example 32

The procedures of Example 16 were repeated except that silver tetrakis(pentafluorophenyl)borate was used instead of ferrocenium tetrakis(pentafluorophenyl)borate. As a result, 48 g of a copolymer were obtained. The polymerization activity was 18 Kg/gZr.

The obtained copolymer had a norbornene content of 7 mol %; an intrinsic viscosity of 1.94 dl/g; and a crystallization degree of 6%.

Example 33

The procedures of Example 16 were repeated except that 100 mmol of 1,4,5,8-dimethano-1,2,3,4,4a,5,8,8a-octahydronaphthalene was used instead of norbornene. As a result, 35 g of a copolymer were obtained. The polymerization activity was 13 Kg/gZr.

The obtained copolymer had a cyclic olefin content of 5 mol %; an intrinsic viscosity of 1.57 dl/g; and a crystallization degree of 9%.

Example 34

The procedures of Example 33 were repeated except that dimethylsilylenebis(cyclopentadienyl)dimethylzirconium was used instead of bis(cyclopentadienyl)dimethylzirconium, and the polymerization time was chagnged to 4 hours. As a result, 14 g of a copolymer were obtained. The polymerization activity was 5 Kg/gZr.

The obtained copolymer had a cyclic olefin content of 39 mol %; an intrinsic viscosity of 1.61 dl/g; and a crystallization degree of 0%.

Example 35

A 1 liter autoclave was charged with 400 ml of dried toluene, 0.6 mmol of triisobutylaluminum, 0.03 mmol of ferrocenium tetrakis(pentafluorophenyl)borate, 0.03 mmol of bis(cyclopentadienyl)dimethylzirconium and 230 mmol of norbornene. Then, propylene was introduced into the autoclave to keep a propylene pressure of 2 Kg/cm$^2$, and the polymerization was carried out at 50° C. for 1 hour while ethylene was continuously introduced so as to keep a total pressure to 5 Kg/cm$^2$. As a result, 41 g of a copolymer were obtained. The polymerization activity was 15 Kg/gZr.

The obtained copolymer had a norbornene content of 7 mol %; an intrinsic viscosity of 1.47 dl/g; and a crystallization degree of 0%.

Example 36

A 1 liter autoclave was charged with 400 ml of dried toluene, 0.6 mmol of triisobutylaluminum, and 0.05 mmol of bis(cyclopentadienyl)dichlorozirconium. After agitation, 0.01 mmol of benzyl(4-cyano)pyridinium tetrakis (pentafluorophenyl)borate and 200 mmol of norbornene were added. Then, the polymerization was carried out at 90° C. at an ethylene pressure of 9 Kg/cm$^2$ for 0.5 hours, to obtain 33 g of a copolymer. The polymerization activity was 72 Kg/gZr.

The obtained copolymer had a norbornene content of 6 mol %; and an intrinsic viscosity of 2.01 dl/g.

Example 37

The procedures of Example 36 were repeated except that methyl(2-cyano)pyridinium tetrakis(pentafluorophenyl) borate was used instead of benzyl(4-cyano)pyridinium tetrakis(pentafluorophenyl)borate. As a result, 15 g of a copolymer were obtained. The polymerization activity was 33 Kg/gZr.

The obtained copolymer had a norbornene content of 5 mol %; and an intrinsic viscosity of 2.34 dl/g.

Example 38

The procedures of Example 36 were repeated except that tetraphenylporphyrin manganese tetrakis (pentafluorophenyl)borate was used instead of benzyl(4-cyano)pyridinium tetrakis(pentafluorophenyl)borate. As a result, 58 g of a copolymer were obtained. The polymerization activity was 127 Kg/gZr.

The obtained copolymer had a norbornene content of 6 mol %; and an intrinsic viscosity of 1.95 dl/g.

Example 39

A 1 liter autoclave was charged with 400 ml of dried hexane. Then, a catalyst solution prepared by pre-mixing 10 ml of toluene, 0.6 mmol of triisobutylaluminum, and 0.06 mmol of bis(cyclopentadienyl)dichlorozirconium and 0.006 mmol of dimethylanilinium tetrakis(pentafluorophenyl) borate was added to the autoclave. After agitation, 200 mmol of norbornene was added. Then, the polymerization was carried out at 90° C. at an ethylene pressure of 9 Kg/cm$^2$ for 0.4 hours, to obtain 10 g of a copolymer. The polymerization activity was 18 Kg/gZr.

The obtained copolymer had a norbornene content of 16 mol %; and an intrinsic viscosity of 0.42 dl/g.

Example 40

The procedures of Example 39 were repeated except that a mixed solvent of 200 ml of hexane and 200 ml of toluene was used instead of 400 ml of dried hexane. As a result, 59 g of a copolymer were obtained. The polymerization activity was 108 Kg/gZr.

The obtained copolymer had a norbornene content of 4.2 mol %; and an intrinsic viscosity of 1.14 dl/g.

Example 41

The procedures of Example 39 were repeated except that dried cyclohexane was used instead of dried hexane, and bis(cyclopentadienyl)dichlorozirconium and dimethylanilinium tetrakis(pentafluorophenyl)borate were used in an amount of 0.03 mmol, respectively. As a result, 67 g of a copolymer were obtained. The polymerization activity was 24 Kg/gZr.

The obtained copolymer had a norbornene content of 7.2 mol %; and an intrinsic viscosity of 1.26 dl/g.

Example 42

The procedures of Example 16 were repeated except that trimethylaluminum, bis(cyclopentadienyl)dichlorozirconium and dimethylanilinium tetrakis (pentafluorophenyl)borate were used insead of triisobutylaluminum, bis(cyclopentadienyl)dimethylzirconium and ferrocenium tetrakis (pentafluorophenyl)borate, respectively. As a result, 33 g of a copolymer were obtained. The polymerization activity was 12 Kg/gZr.

The obtained copolymer had a norbornene content of 10 mol %; and an intrinsic viscosity of 2.00 dl/g.

Example 43

The procedures of Example 42 were repeated except that triethylaluminum was used instead of trimethylaluminum. As a result, 17 g of a copolymer were obtained. The polymerization activity was 6.2 Kg/gZr.

The obtained copolymer had a norbornene content of 10 mol %; and an intrinsic viscosity of 1.92 dl/g.

Example 44

A 1 liter autoclave was charged with 400 ml of dried toluene, 0.4 mmol of triisobutylaluminum, and 0.003 mmol of bis(cyclopentadienyl)dichlorozirconium. After agitation, 0.006 mmol of methyldiphenylammonium tetrakis (pentafluorophenyl)borate and 260 mmol of norbornene were added. Then, the polymerization was carried out at 90° C. at an ethylene pressure of 6 Kg/cm$^2$ for 0.5 hours, to obtain 57 g of a copolymer. The polymerization activity was 208 Kg/gZr.

The obtained copolymer had a norbornene content of 7.9 mol %; and an intrinsic viscosity of 1.13 dl/g.

Example 45

The procedures of Example 42 were repeated except that methylaluminoxane was used instead of trimethylaluminum. As a result, 53 g of a copolymer were obtained. The polymerization activity was 19 Kg/gZr.

The obtained copolymer had a norbornene content of 8 mol %; and an intrinsic viscosity of 1.83 dl/g.

Example 46

A 1 liter autoclave was charged with 400 ml of dried toluene, 0.6 mmol of triisobutylaluminum, and 0.002 mmol of bis(cyclopentadienyl)dihydridezirconium. After agitation, 0.004 mmol of dimethylanilinium tetrakis (pentafluorophenyl)borate and 200 mmol of norbornene were added. Then, the polymerization was carried out at 90° C. at an ethylene pressure of 7 Kg/cm$^2$ for 0.5 hours, to obtain 48 g of a copolymer. The polymerization activity was 263 Kg/gZr.

The obtained copolymer had a norbornene content of 4.7 mol %; and an intrinsic viscosity of 1.46 dl/g.

Example 47

The procedures of Example 42 were repeated except that triisobutylaluminum was used instead of trimethylaluminum, and bis(cyclopentadienyl)dimethyltitanium was used instead of bis(cyclopentadienyl)dichlorozirconium. As a result, 31 g of a copolymer were obtained. The polymerization activity was 22 Kg/gTi.

The obtained copolymer had a norbornene content of 3.6 mol %; and an intrinsic viscosity of 1.83 dl/g.

Example 48

The procedures of Example 42 were repeated except that triisobutylaluminum was used instead of trimethylaluminum, and 5-methylnorbornene was used instead of norbornene. As a result, 38 g of a copolymer were obtained. The polymerization activity was 14 Kg/gZr.

The obtained copolymer had a cyclic olefin content of 7 mol %; and an intrinsic viscosity of 1.97 dl/g.

Example 49

The procedures of Example 48 were repeated except that 5-benzylnorbornene was used instead of 5-methylnorbornene. As a result, 13 g of a copolymer were obtained. The polymerization activity was 4.8 Kg/gZr.

The obtained copolymer had a cyclic olefin content of 11 mol %; and an intrinsic viscosity of 2.15 dl/g.

Example 50

The procedures of Example 42 were repeated except that triisobutylaluminum was used instead of trimethylaluminum, and propylene was used instead of ethylene. As a result, 17 g of a copolymer were obtained. The polymerization activity was 6.2 Kg/gZr.

The obtained copolymer had a norbornene content of 6.4 mol %; and an intrinsic viscosity of 0.62 dl/g.

Example 51

A 1 liter autoclave was charged with 400 ml of dried toluene, 0.6 mmol of triisobutylaluminum, and 0.006 mmol of bis(cyclopentadienyl)dichlorozirconium. After agitation, 0.006 mmol of dimethylanilinium tetrakis (pentafluorophenyl)borate and 200 mmol of norbornene were added. Then, the polymerization was carried out at 70° C. at an ethylene pressure of 9.5 Kg/cm$^2$ for 0.5 hours, to obtain 53 g of a copolymer. The polymerization activity was 97 Kg/gZr.

The obtained copolymer had a norbornene content of 5 mol %; and an intrinsic viscosity of 1.43 dl/g.

Example 52

The procedures of Example 51 were repeated except that dimethylanilinium tetrakis(pentafluorophenyl)borate was used in an amount of 0.012 mmol. As a result, 97 g of a copolymer were obtained. The polymerization activity was 177 Kg/gZr.

The obtained copolymer had a norbornene content of 5 mol %; and an intrinsic viscosity of 1.45 dl/g.

Example 53

The procedures of Example 51 were repeated except that triisobutylaluminum was used in an amount of 1.8 mmol. As a result, 78 g of a copolymer were obtained. The polymerization activity was 143 Kg/gZr.

The obtained copolymer had a norbornene content of 4 mol %; and an intrinsic viscosity of 1.67 dl/g.

Example 54

The procedures of Example 39 were repeated except that dimethylanilinium tetrakis(pentafluorophenyl)borate was used in an amount of 0.012 mmol, and the polymerization was carried out at an ethylene pressure of 30 g/cm$^2$ for 10 minutes. As a result, 78 g of a copolymer were obtained. The polymerization activity was 143 Kg/gZr.

The obtained copolymer had a norbornene content of 3 mol %; and an intrinsic viscosity of 1.39 dl/g.

Example 55

The procedures of Example 54 were repeated except that the polymerization temperature was changed to 130° C. As a result, 12 g of a copolymer were obtained. The polymerization activity was 22 Kg/gZr.

The obtained copolymer had a norbornene content of 4 mol %; and an intrinsic viscosity of 1.65 dl/g.

Example 56

(1) Preparation of Catalyst Solution

A 2 liter glass vessel was charged with 500 ml of dried toluene, 10 mmol of triisobutylaluminum, 0.2 mmol of bis(cyclopentadienyl)dichlorozirconium and 0.3 mmol of dimethylanilinium tetrakis(pentafluorophenyl)borate, to obtain a catalyst solution.

(2) Continuous Polymerization

A 2 liter autoclave for continuous polymerization, was charged with 1 liter of dried toluene, 90 ml of the catalyst solution prepared in Step (1) above and 360 mmol of norbornene. The polymerization was carried out at 90° C. at an ethylene pressure of 5 Kg/cm$^2$ for 0.5 hours. Thereafter, toluene, the catlyst solution and norbornene were supplied to the autoclave at a rate of 1 liter/hour, 90 ml/hour and 360 mmol/hour, respectively while the polymer solution was continuously taken out so as to keep the amount of the reaction mixture in the autocalve to 1 liter. Further, ethylene was also continuously supplied to the autoclave so as to keep the ethylene partial pressure to 5 Kg/cm$^2$ and the polymerization temperature was kept at 90° C. As a result, a Copolymer was obtained at a production rate of 158 g/hours. The polymerization activity was 48 Kg/gZr.

The obtained copolymer had a norbornene content of 5 mol %; and an intrinsic viscosity of 1.64 dl/g.

Example 57

A 500 ml flask was charged with 150 ml of dried toluene, 5 mmol of triisobutylaluminum, and 0.025 mmol of bis (cyclopentadienyl)dichlorozirconium. After agitation, 0.025 mmol of dimethylanilinium tetrakis (pentafluorophenyl) borate and 50 mmol of norbornadiene were added. Then, the polymerization was carried out at 25° C. for 3 hours while introducing ethylene at a rate of 30 l/hour, to obtain 0.35 g of a copolymer. The polymerization activity of 0.15 K/gZr.

The obtained copolymer had a norbornene content of 45 mol %; and an intrinsic viscosity of 0.21 dl/g.

Example 58

The procedures of Example 50 were repeated except that ethylenebis(indenyl)dichlorozirconium was used instead of bis(cyclopentadienyl)dichlorozirconium. As a result, 23 g of a copolymer were obtained. The polymerization activity was 8 Kg/gZr.

The obtained copolymer had a norbornene content of 7 mol %; and an intrinsic viscosity of 0.76 dl/g.

Example 59

The procedures of Example 50 were repeated except that isopropyl(cyclopentadienyl)(9-fluorenyl)dichlorozirconium was used instead of bis(cyclopentadienyl) dichlorozirconium. As a result, 21 g of a copolymer were obtained. The polymerization activity was 8 Kg/gZr.

The obtained copolymer had a norbornene content of 6.8 mol %; and an intrinsic viscosity of 0.54 dl/g.

Example 60

A 1 liter autoclave was charged with 400 ml of dried toluene, 0.6 mmol of triisobutylaluminum, and 0.003 mmol of bis(cyclopentadienyl)dichlorozirconium. After agitation, 0.006 mmol of dimethylanilinium tetrakis (pentafluorophenyl)borate and 400 mmol of norbornene were added. Then, the polymerization was carried out at 90° C. at an ethylene pressure of 6 Kg/cm$^2$ and a hydrogen pressure of 2 Kg/cm$^2$ for 0.5 hours, to obtain 8 g of a copolymer. The polymerization activity was 29 Kg/gZr.

The obtained copolymer had a norbornene content of 7 mol %; and an intrinsic viscosity of 0.06 dl/g.

Example 61

The procedures of Example 16 were repeated except that (cyclopentadienyl)trichlorozirconium was used instead of bis(cyclopentadienyl)dimethylzirconium, and dimethylanilinum tetakis(pentafluorophenyl)borate was used instead of ferrocenium tetrakis(pentafluorophenyl)borate. As a result, 66 g of a copolymer were obtained. The polymerization activity was 24 Kg/gZr.

The obtained copolymer had a norbornene content of 8 mol %; and an intrinsic viscosity of 2.34 dl/g.

Example 62

The procedures of Example 61 were repeated except that (pentamethylcyclopentadienyl)trichlorozirconium was used instead of (cyclopentadienyl)trichlorozirconium. As a result, 68 g of a copolymer were obtained. The polymerization activity was 25 Kg/gZr.

The obtained copolymer had a norbornene content of 6 mol %; and an intrinsic viscosity of 2.51 dl/g.

Example 63

The procedures of Example 61 were repeated except that (pentamethylcyclopentadienyl)trimethylzirconium was used instead of (cyclopentadienyl)trichlorozirconium. As a result, 71 g of a copolymer were obtained. The polymerization activity was 26 Kg/gZr.

The obtained copolymer had a norbornene content of 7 mol %; and an intrinsic viscosity of 2.47 dl/g.

Example 64

The procedures of Example 61 were repeated except that (pentamethylcyclopentadienyl)trimethoxyozirconium was used instead of (cyclopentadienyl)trichlorozirconium. As a result, 65 g of a copolymer were obtained. The polymerization activity was 24 Kg/gZr.

The obtained copolymer had a norbornene content of 6.5 mol %; and an intrinsic viscosity of 2.68 dl/g.

Example 65

The procedures of Example 46 were repeated except that 0.002 mmol of tetrabenzylzirconium was used instead of bis(cyclopentadienyl)dihydridezirconium. As a result, 62.7 g of a copolymer were obtained. The polymerization activity was 344 Kg/gZr.

The obtained copolymer had a norbornene content of 6.5 mol %; and an intrinsic viscosity of 1.76 dl/g.

Example 66

The procedures of Example 65 were repeated except that 0.002 mmol of tetrabutoxyzirconium was used instead of tetrabenzylzirconium. As a result, 37.1 g of a copolymer were obtained. The polymerization activity was 203 Kg/gZr.

The obtained copolymer had a norbornene content of 5.5 mol %; and an intrinsic viscosity of 1.89 dl/g.

Example 67

The procedures of Example 65 were repeated except that 0.002 mmol of tetrachlorozirconium was used instead of tetrabenzylzirconium. As a result, 69.1 g of a copolymer were obtained. The polymerization activity was 379 Kg/gZr.

The obtained copolymer had a norbornene content of 5.5 mol %; and an intrinsic viscosity of 1.71 dl/g.

Example 68

The procedures of Example 51 were repeated except that bis(cyclopentadienyl)dimethylzirconium was used instead of bis(cyclopentadienyl)dichlorozirconium, and tris(pentafluorophenyl)boron was used instead of dimethylanilinum tetakis(pentafluorophenyl)borate. As a result, 12 g of a copolymer were obtained. The polymerization activity was 22 Kg/gZr.

The obtained copolymer had a norbornene content of 8 mol %; and an intrinsic viscosity of 1.64 dl/g.

Example 69

A 1000 ml glass autoclave was charged with 500 ml of dried toluene, 10 mmol of triisobutylaluminum, 0.25 mmol of bis(cyclopentadienyl)dichlorozirconium and 0.25 mmol of dimethylanilinum tetrakis(pentafluorophenyl)borate. After agitation, 1 mol of norbornadiene was added. Then, the polymerization was carried out at 20° C. for 4 hours, to obtain 2.76 g of a copolymer. The polymerization activity was 0.12 Kg/gZr.

The obtained copolymer had a molecular weight (Mw) of 1,700 and a molecular weight distribution (Mw/Mn) of 2.83.

Comparative Example 6

A 1 liter autoclave, under nitrogen atmosphere was charged with 400 ml of toluene, 8 mmol of ethylaluminumsesquichloride ($Al(C_2H_5)_{1.5}Cl_{1.5}$), 0.8 mmol of $VO(OC_2H_5)Cl_2$ and 130 mmol of norbornene. The reaction mixture was heated to 40° C. and the reaction was carried out for 60 minutes while continuously introducing ethylene so as to keep the ethylene partial pressure to 3 Kg/cm². As a result, the yield was 6.16 g. The polymerization activity was 0.15 Kg/gZr.

The obtained copolymer had a norbornene content of 12 mol %; and an intrinsic viscosity of 1.20 dl/g.

Example 70

The procedures of Example 34 were repeated except that the ethylene pressure was changed to 4 Kg/cm², and the polymerization temperature was changed to 70° C. As a result, 17 g of a copolymer were obtained. The polymerization activity was 6.2 Kg/gZr.

The obtained copolymer had a norbornene content of 57 mol %; and an intrinsic viscosity of 1.47 dl/g.

Example 71

(1) Preparation of Triethylammonium Tetrakis(pentafluorophenyl)borate:

Triethylammonium tetrakis(pentafluorophenyl)borate was prepared in the same manner as in Example 1.

(2) Preparation of Catalyst:

One millimole of (cyclopentadienyl)trimethyltitanium was reacted with 1 mmol of triethylammonium tetrakis(pentafluorophenyl)borate in 50 ml of toluene at room temperature for 4 hours. After the solvent was removed, the obtained solid product was washed with 20 ml of petroleum ether, dried and dissolved in 50 ml of toluene to obtain a catalyst solution.

(3) Polymerization:

A 100 ml flask was charged with 25 mmol of norbornadiene, 0.05 mmol Of the catalyst (as transition metal component), and 25 ml of toluene. Then, the reaction was carried out at 20° C. for 4 hours. The reaction product was placed into methanol and the precipitated white solid product was recovered by filtration. Then, the obtained product was washed with methanol and dried. The yield was 0.41 g.

The obtained product had a polymerization activity of 170 g/gTi, and a molecular weight of 40,900. It was found that the obtained product was soluble to conventional solvents such as toluene, chloroform and tetrahydrofuran.

It was also found by infrared spectrophotometry that the obtained product showed strong absorption at 800 cm$^{-1}$ which is derived from the following structural unit (A). It was also found by $^1$H-NMR that the obtained product showed absorption derived from a carbon-carbon double bond at 6.2 ppm, and did not show absorption derived from a carbon-carbon double bond contained in a polymer main chain at 5.3 ppm. Accordingly, it was confirmed that the obtained product had the following structural units:

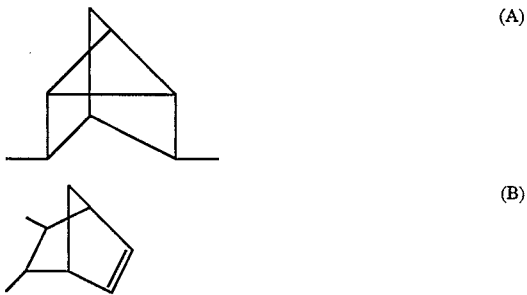

Example 72

In a 100 ml flask, 25 mmol of norbornadiene, 0.005 mmol of (cyclopentadienyl)tribenzyltitanium, and 0.005 mmol of triethylammonium tetrakis(pentafluorophenyl)borate were reacted in 50 ml of toluene at 20° C. for 4 hours. Thereafter, the reaction mixture was placed into 100 ml of methanol and the precipitated white solid product was recovered by filtration. Then, the obtained product was washed with 50 ml of methanol, and dried under reduced pressure to obtain 0.27 g of white powders. The polymerization activity was 1.1 Kg/gTi.

The obtained product had a molecular weight (Mw) of 42,000.

Example 73

In a 100 ml flask, 25 mmol of norbornadiene, 0.005 mmol of (cyclopentadienyl)trimethyltitanium, 0.005 mmol of triethylammonium tetrakis(pentafluorophenyl)borate and 0.1 mmol of triisobutylaluminum, were reacted in 50 ml of toluene. After agitation at 20° C. for 4 hours, the reaction mixture was placed into 100 ml of methanol. A white solid product was precipitated, recovered by filtration, and then dried to obtain 0.92 g of a solid product. The polymerization activity was 3.81 Kg/gTi.

The obtained product had a molecular weight (Mw) of 61,000.

Example 74

In a 100 ml flask, 25 mmol of norbornadiene, 0.005 mmol of (pentamethylcyclopentadienyl)trimethyltitanium, 0.005 mmol of triethylammonium tetrakis(pentafluorophenyl) borate and 0.1 mmol of triisobutylaluminum, were reacted in 50 ml of toluene. After agitation at 20° C. for 4 hours, the reaction mixture was placed into 100 ml of methanol. A white solid product was precipitated,. recovered by filtration, and then dried to obtain 0.45 g of a solid product.

The polymerization activity of 1.9 Kg/gTi.

Comparative Example 7

In a 100 ml flask, 25 mmol of norbornadiene, 0.005 mmol of (cyclopentadienyl)trimethyltitanium and 0.005 mmol of aluminoxane were reacted in 50 ml of toluene at 20° C. for 4 hours, but a polymer was not obtained.

Example 75

(1) Preparation of Triethylammonium Tetrakis (pentafluorophenyl)borate:

In the same manner as in Example 1, 12.8 mol of triethylammonium tetrakis(pentafluorophenyl)borate was prepared, and dissolved in 1280 ml of toluene to obtain a catalyst solution.

(2) Preparation of Dimethylsilylenebis(cyclopentadienyl) dichlorozirconium:

Dicyclopentadienyldimethylsilane (1.73 g; 9.19 mmol) was dissolved in 50 ml of dehydrated tetrahydrofuran. To the obtained solution, 12.0 ml (18.6 mmol) of a butyllithium/ hexane solution (1.55 mol/l) was added dropwise at −75° C. over a period of 1 hour. After agitation for 30 minutes, the reaction mixture was heated to 0° C. To the obtained reaction mixture, 50 ml of dehydrated tetrahydrofuran containing 2.14 g (9.18 mmol) of zirconium tetrachloride dissolved therein, was added dropwise over a period of 1 hour. Then, the reaction mixture was stirred at room temperature over night. After the reaction mixture was heated to 50° C. for 2 hours, the solvent was removed to obtain a solid product. The obtained solid product was washed with a small amount of cooled pentane. Further, the solid product was subjected to a methylene chloride extraction and recrystallization by concentration to obtain 2.20 g (6.31 mmol) of dimethylsilylenebis cyclopentadienyl)dichlorozirconium (Reference: Inorg., Chem., Vol. 24, Page 2539 (1985)).

The obtained product was suspended in 631 ml of toluene to obtain a catalyst solution.

(3) Copolymerization of Norbornene and Ethylene:

A 500 ml glass autoclave purged with nitrogen, was charged with 200 ml of toluene and 1.0 mmol of triisobutylaluminum. Further, 10 micromol of dimethylsilylenebis (cyclopentadienyl)dichlorozirconium obtained in Step (2) above and 10 micromol of triethylammonium tetrakis (pentafluorophenyl)borate obtained in Step (1) above were added to the reaction mixture. Then, 22 mmol of norbornene was added. After the reaction mixture was heated to 50° C., the polymerization was carried out at normal pressure for 1 hour while introducing ethylene gas at a rate of 40 l/hr. The polymerization was proceeded in a uniform solution state. After completion of the reaction, the reaction solution was placed into 1 liter of HCl acidic methanol to precipitate a polymer. After, the catalyst components were removed by decomposition, the product was washed and dried to obtain 1.47 g of a copolymer. The polymerization activity was 1.6 Kg/gZr.

The obtained copolymer had a norbornene content of 68 mol %; an intrinsic viscosity of 0.3 dl/g; a glass transition temperature (Tg) of 182° C.; and a softening point (TMA) of 175° C. A sheet made of the copolymer had an all light transmittance of 94.0% and haze of 3.2%.

Example 76

The procedures of Example 75 were repeated except that the amount of norbornene used was changed to 44 mmol in Step (3). As a result, 1.64 g of a copolymer were obtained. The polymerization activity was 1.8 Kg/gZr.

The obtained copolymer had a norbornene content of 74 mol %; an intrinsic viscosity of 0.49 dl/g; a glass transition temperature (Tg) of 199° C.; and a softening point (TMA) of 190° C. A sheet made of the copolymer had an all light transmittance of 94.5% and haze of 3.0%.

Example 77

The procedures of Example 75 were repeated except that the amount of norbornene used was changed to 33 mmol in Step (3). As a result, 2.44 g of a Copolymer were obtained. The polymerization activity was 2.7 Kg/gZr.

The obtained copolymer had a norbornene content of 72 mol %; an intrinsic viscosity of 0.50 dl/g; a glass transition temperature (Tg) of 193° C.; a softening point (TMA) of 185° C.; a tensile strength of 260 Kg/cm$^2$; an elongation of 1%; and a tensile modulus of 29,000 Kg/cm$^2$. A sheet made of the copolymer had an all light transmittance of 93% and haze of 3%.

Example 78

The procedures of Example 75 were repeated except that 10 micromol of bis(cyclopentadienyl)dichlorozirconium was used instead of dimethylsilylenebis(cyclopentadienyl) dichlorozirconium in Step (3). As a result, 1.86 g of a copolymer were obtained. The polymerization activity was 2.0 Kg/gZr.

The obtained copolymer had a norbornene content of 4 mol %; and an intrinsic viscosity of 0.76 dl/g. The glass transition temperature (Tg) could not be measured at room temperature or higher.

Example 79

(1) Preparation of Dimethylsilylenebis(indenyl) dichlorozirconium:

The procedures of Step (2) of Example 75 were repeated to prepare 0.61 g (1.36 mmol) of dimethylsilylenebis (indenyl)dichlorozirconium, except that 2.65 g (9.2 mmol) of diindenyldimethylsilane was used instead of dicyclopentadienyldimethylsilane (Reference: Angew. Chem. Int. Ed. Engl., Vol. 28, Page 1511 (1989)).

The obtained product was suspended in 136 ml of toluene to prepare a catalyst solution.

(2) Copolymerization of Norbornene/Ethylene:

The procedures of Step (3) of Example 75 were repeated except that 10 micromol of dimethylsilylenebis(indenyl) dichlorozirconium was used instead of dimethylsilylenebis (cyclopentadienyl)dichlorozirconium, and the amount of norbornene used was changed to 66 mmol. As a result, 3.38 g of a copolymer were obtained. The polymerization activity was 3.7 Kg/gZr.

The obtained copolymer had a norbornene content of 67 mol %; an intrinsic viscosity of 1.4 dl/g; a glass transition temperature (Tg) of 176° C.; and a softening point (TMA) of 168° C. A sheet made of the copolymer had an all light transmittance of 94.0% and haze of 3.1%.

Example 80

The procedures of Step (2) of Example 79 were repeated except that the amount of norbornene used was changed to 100 mmol. As a result, 2.88 g of a copolymer were obtained. The polymerization activity was 3.2 Kg/gZr.

The obtained copolymer had a norbornene content of 72 mol %; an intrinsic viscosity of 1.2 dl/g; a glass transition temperature (Tg) of 205° C.; and a softening point (TMA) of 195° C.

Comparative Example 8

The procedures of Step (3) of Example 75 were repeated except that 1.0 ml (1.0 mmol) of a toluene solution (1 mol/l) containing ethylaluminumsesquichloride $(Al(C_2H_5)_{1.5}Cl1.5)$ was used instead of triisobutylaluminum; 0.25 ml (0.25 mmol) of a toluene solution (1 mol/l) containing $VO(OC_2H_5)Cl_2$ was used instead of dimethylsilylenebis(cyclopentadienyl)dichlorozirconium; triethylammonium tetrakis(pentafluorophenyl)borate was not used; and the amount of norbornene used was changed to 100 mmol. As a result, 1.38 g of a copolymer were obtained. The polymerization activity was 0.11 Kg/gZr.

The obtained copolymer had a norbornene content of 48 mol %; an intrinsic viscosity of 1.2 dl/g; a glass transition temperature (Tg) of 104° C.; and a softening temperature (TMA) of 98° C.

Example 81

(1) Synthesis of Catalyst Component (B):

The procedures of Example 15 were repeated to prepare ferrocenium tetrakis(pentafluorophenyl)borate.

(2) Polymerization:

A 30 liter autoclave was charged with 8 liter of dried toluene, 12 ml of triisobutylaluminum, 0.6 mmol of ferrocenium tetrakis(pentafluorophenyl)borate as obtained in Step (1), 0.6 mmol of bis(cyclopentadienyl)dimethylzirconium and 4 mol of norbornene. The polymerization was carried out at 50° C., at an ethylene pressure of 5 Kg/cm²·G for 1 hour. After completion of the reaction, the polymer solution was placed in 15 liter of methanol to precipitae a polymer. The polymer was recovered by filtaration to obtain 2.4 Kg of a copolymer. The polymerization conditions are as shown in Table 1. The polymerization activity was 44 Kg/gZr.

The obtained copolymer had a norbornene content of 6 mol %; an intrinsic viscosity of 2.10 dl/g; and a crystalline degree of 16%.

It was found that the polymer obtained had a random structure since it had low crystallization degree and good transparency.

(3) Molding of Sheet:

The copolymer obtained in Step (2) above was subjected to T-die molding using 20 mm extruder with a lip gap of 0.5 mm at a screw roation rate of 30 rpm at a lip temperature of 205° C., to prepare a sheet having a thickness of 0.2 mm. The results of measurment of optical properties, and physical properties such as modulus, an elastic recovery property are as shown in Table 2.

Examples 82 to 86

The similar procedures of Example 81 were repeated to prepare several copolymers with different norbornene content and 0.2 mm thick sheets therefrom. The polymerization conditions are as shown in Table 1. The results of evaluation of the sheets obtained in physical properties are as shown in Table 2.

It was found that these copolymer obtained had a random structure since it had low crystallization degree and good transparency.

Example 87

Under the conditions as shown in Table 1, an ethylene/norbornene copolymer having an intrinsic viscosity of 1.69 dl/g and a norbornene content of 23.7 mol % was synthesized. The 0.2 mm thick sheet obtained from the copolymer was evaluated in an elastic recovery property. As a result, the sheet was torn before 150% elongation and the elastic recovery property could not be measured. The results of the physical property testing of the sheet obtained are as shown in Table 2.

Comparative Example 9

A 0.2 mm thick sheet was prepared from conventional high density polyethylene (IDEMITSU 640UF: Manufactured by Idemitsu Petrochemical). The sheet obtained showed an elastic recovery of −50%. The results of the physical property measurement of the sheet obtained are as shown in Table 2.

Comparative Example 10

A 0.2 mm thick sheet was prepared from a conventional ethylene/alpha-olefin copolymer (MOATEC 0168N: Manufactured by Idemitsu Petrochemical). The sheet obtained showed an elastic recovery of −15%. The results of the physical property measurement of the sheet obtained are as shown in Table 2.

TABLE 1

| | Catalyst Component | | | Amount of | Ethylene*[4] | Polymerization | Yield | Activity |
| --- | --- | --- | --- | --- | --- | --- | --- | --- |
| | (A)*[1] | (B)*[2] | (C)*[3] | Norbornene | Pressure | Temperature | kg | kg/gZr |
| Example 81 | ZM 0.6 mmol | F 0.6 mmol | TIBA 12 mmol | 4 mmol | 5 | 50° C. | 2.4 | 44 |
| Example 82 | ZC 0.4 mmol | F 0.4 mmol | TIBA 8 mmol | 4 mmol | 10 | 50° C. | 0.7 | 19 |
| Example 83 | ZM 0.6 mmol | AN 0.6 mmol | TIBA 12 mmol | 4 mmol | 5 | 50° C. | 1.8 | 33 |
| Example 84 | ZC 0.6 mmol | AN 0.6 mmol | TIBA 12 mmol | 8 mmol | 5 | 50° C. | 0.8 | 15 |

TABLE 1-continued

| | Catalyst Component | | | Amount of | Ethylene*[4] | Polymerization | Yield | Activity |
|---|---|---|---|---|---|---|---|---|
| | (A)*[1] | (B)*[2] | (C)*[3] | Norbornene | Pressure | Temperature | kg | kg/gZr |
| Example 85 | ZC 0.4 mmol | AN 0.4 mmol | TIBA 8 mmol | 6 mmol | 5 | 50° C. | 0.5 | 14 |
| Example 86 | ZC 0.6 mmol | AN 0.6 mmol | TIBA 12 mmol | 5 mmol | 5 | 50° C. | 2.0 | 37 |
| Example 87 | ZC 1.0 mmol | AN 1.0 mmol | TIBA 20 mmol | 4 mmol | 3 | 50° C. | 0.8 | 9 |

*[1]: ZM ... bis (cyclopentadienyl) dimethyl zirconium
ZC ... bis (cyclopentadienyl) dichlorozirconium
*[2]: F ... ferrocenium tetra (pentafluorophenyl) borate
AN ... dimethylanilinium tetra (pentafluorophenyl) borate
*[3]: TIBA ... triisobutylaluminum
*[4]: Unit is Kg/cm$^2$G

TABLE 2

| | Copolymers | | | | | Sheets | | |
|---|---|---|---|---|---|---|---|---|
| | [η] (dl/g) | NB Content (mol %) | Crystallization Degree (%) | Tg (°C.) | Molecular Weight Distribution Mw/Mn | Tensile Modulus (Kg/cm$^2$) | Elastic Recovery (%) | All Light Transmittance (%) |
| Example 81 | 2.10 | 6.0 | 16 | 0 | 1.71 | 561 | 70 | 95 |
| Example 82 | 3.61 | 4.3 | 26 | -7 | 1.99 | 881 | 35 | 94 |
| Example 83 | 2.71 | 8.5 | 13 | 4 | 1.85 | 452 | 66 | 95 |
| Example 84 | 1.00 | 16.4 | 1 or lower | 14 | 1.64 | 365 | 81 | 95 |
| Example 85 | 1.23 | 12.5 | 1 or lower | 11 | 1.73 | 300 | 94 | 95 |
| Example 86 | 2.19 | 8.8 | 11 | 5 | 1.78 | 355 | 78 | 95 |
| Example 87 | 1.69 | 23.7 | — | 42 | 1.95 | 28,900 | Break | 95 |
| Comp. Ex. 9 | 3.13 | 0 | — | — | — | 10,900 | -50 | 93 |
| Comp. Ex. 10 | 1.96 | 0 | — | — | — | 7,400 | -15 | 95 |

Example 88

(1) Preparation of Dimethylanilinium Tetrakis (pentafluorophenyl)borate:

Pentafluorophenyllithium prepared from 152 mmol of bromopentafluorobenzene and 152 mmol of butyllithium was reacted with 45 mmol of boron trichloride in hexane, to obtain tri(pentafluorophenyl)boron as a white solid product.

The obtained tris(pentafluorophenyl)boron (41 mmol) was reacted with an ether solution of pentafluorophenyllithium (41 mmol) in hexane, to isolate lithium tetrakis (pentafluorophenyl)borate as a white solid product.

Thereafter, lithium tetrakis(pentafluorophenyl)borate (16 mmol) was reacted with dimethylaniline hydrochloride (16 mmol) in water, to obtain 11.4 mmol of dimethylanilinium tetrakis(pentafluorophenyl)borate as a white solid product.

It was confirmed by $^1$H-NMR and $^{13}$C-NMR that the reaction product was the target product.

(2) Copolymerization of Norbornene/Ethylene

In a 1 liter autoclave, under nitrogen atmosphere at room temperature, 400 ml of toluene, 0.6 mmol of triisobutylaluminum (TIBA), 3 micromol of bis(cyclopentadienyl) dichlorozirconium, and 4 micromol of dimethylanilinium tetrakis(pentafluorophenyl)borate obtained in Step (1) above were chared in this order. Then, 400 mmol of norbornene was added. After the reaction mixture was heated to 90° C., the polymerization was carried out for 90 minutes while introducing ethylene gas so as to keep the ethylene partial pressue to 7 Kg/cm$^2$.

After completion of the reaction, the polymer solution was placed into 1 litter of methanol to precipitate a polymer. The polymer was recovered by filtration, and dried.

The catalyst components, polymerization conditions and yield of the copolymer in this Example are as shown in Table 3. Further, the norbornene content, intrinsic viscosity, crystallization degree, glass transition temperature (Tg), weight average molecular weight (Mw), number average molecular weight (Mn), molecular weight distrubution (Mw/Mn) and melting point (Tm) of the copolymer obtained, are as shown in Table 4.

Figure 2:
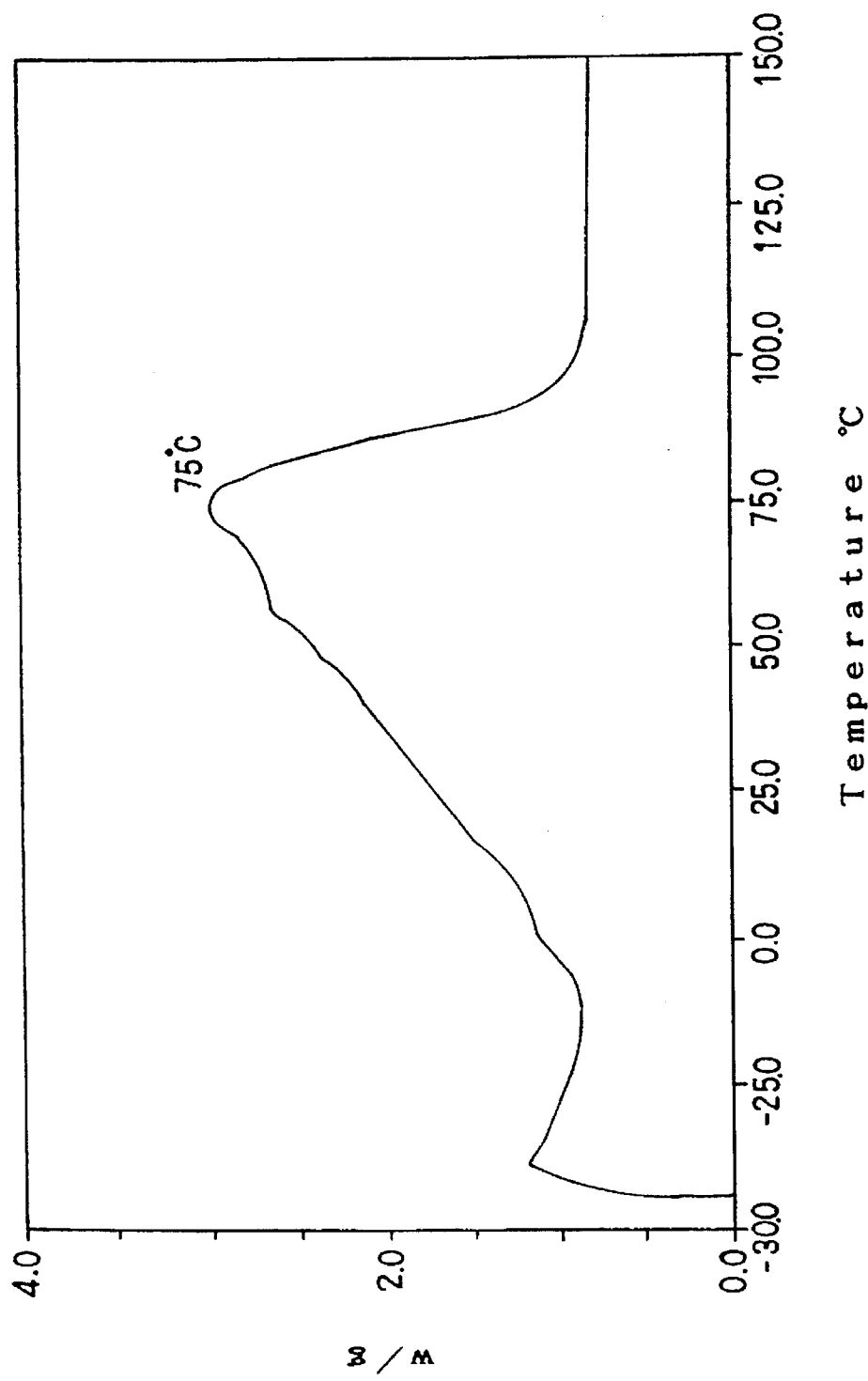
FIG. 2 shows the DSC chart of the copolymer obtained in Example 88.

In the copolymer obtained in Example 88, a broad melt peak was sheen at 75° C. The DSC chart is as shown in FIG. 2.

(3) Molding of Sheet:

The copolymer obtained in Step (2) above was subjected to heat press molding at 190° C. and at a pressure of 100 Kg/cm$^2$, to obtain a 0.1 mm thick sheet.

The tensile modulus, tensile breaking strength, tensile breaking elongation, elastic recovery, all light transmittance and haze were measured, and are as shown in Table 4.

Comparative Example 11

(1) Copolymerization of Norbornene and Ethylene:

A 1 liter autoclave, under nitrogen atmosphere, was charged with 400 ml of toluene, 8 mmol of ethylaluminum sesquichloride (Al(C$_2$H$_5$)$_{1.5}$Cl$_{1.5}$), 0.8 mmol of VO(OC$_2$H$_5$) Cl$_2$ and 130 mmol of norbornene. After the reaction mixture was heated to 40° C., the polymerization was carried out for 180 minutes while continuously introducing ethylene so as to keep the ethylene partial pressue to 3 Kg/cm$^2$.

After completion of the reaction, the polymer solution was placed into 1 liter of methanol to precipitate a polymer. The polymer was recovered by filtration, and dried.

Figure 3:
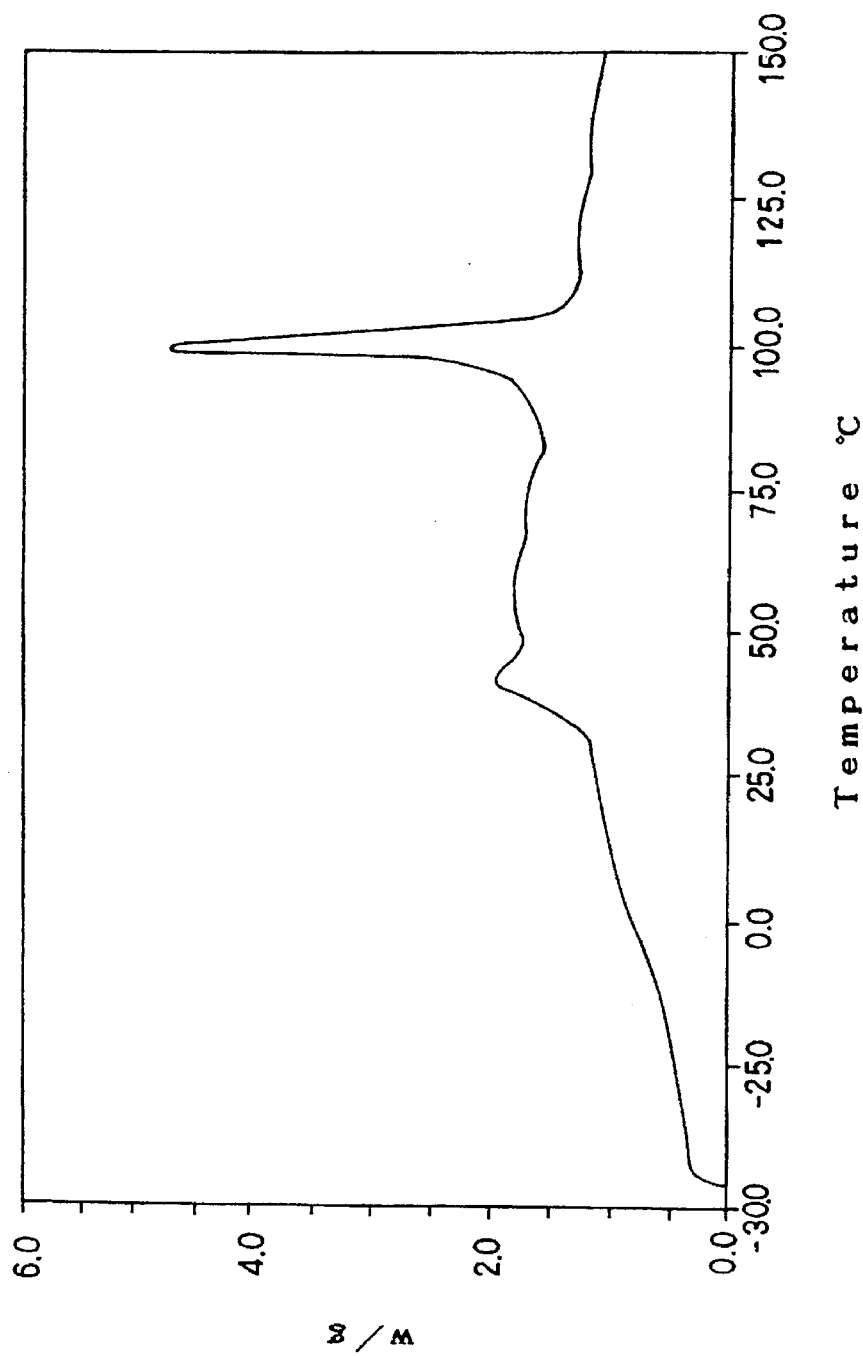
FIG. 3 shows the DSC chart of the copolymer obtained in Comparative Example 11.

(2) Molding of Sheet:

The procedures of Step (3) of Example 88 were repeated using the copolymer obtained in Step (1) above. The results are as shown in Table 4. In the DSC measurement of the copolymer obtained in Comparative Example 11, a sharp melt peak was recognized at 100° C. The DSC chart is as shown in FIG. 3.

Example 89

(1) Copolymerization of Ethylene and Norbornene:

The procedures of Step (2) of Example 88 were repeated except that ferrocenium tetrakis(pentafluorophenyl)borate was used instead of dimethylanilinium tetrakis (pentafluorophenyl)borate, and the other conditions were changed as indicated in Table 3.

Figure 4:
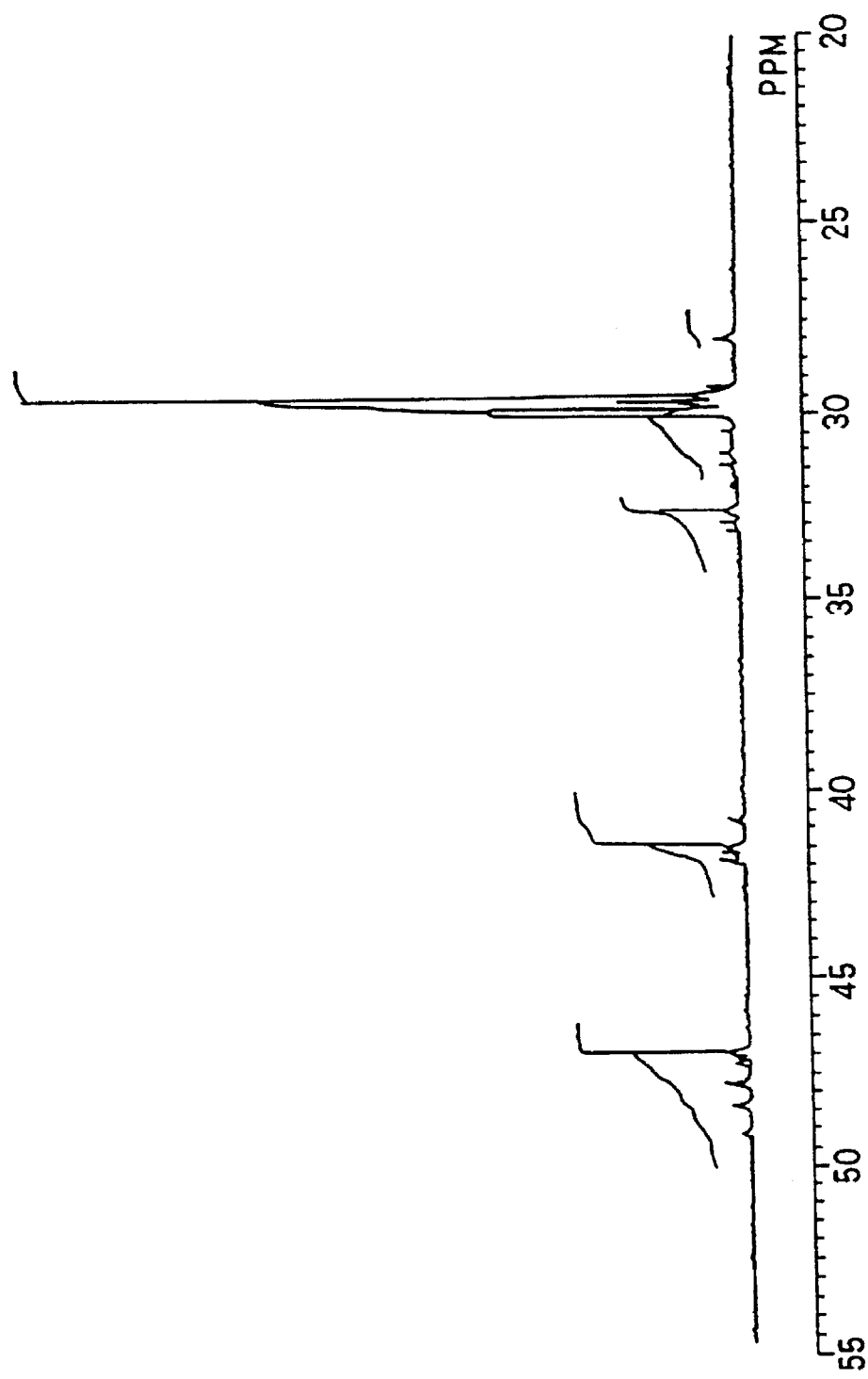
FIG. 4 is the $^{13}$C-NMR chart of the copolymer obtained in Example 91.

The procedures of Example 88 were repeated except that catalyst components and polymerization conditions were changed as indicated in Table 3, to obtain copolymers. FIG. 4 shows a $^{13}$C-NMR char of the copolymer obtained in Example 91.

(2) Modling of Sheet:

The procedures of Step (3) of Example 88 were repeated using the copolymers obtained in Step (2) above. The resusts are as shown in Table 4.

TABLE 3

| | Catalyst Components | | | Amount of Norbornene (mmol) | Ethylene Pressure (Kg/cm$^2$) | Polymerization Temperature (°C.) | Polymerization Time (分) | Yield of Copolymer (g) |
|---|---|---|---|---|---|---|---|---|
| | (A)*$^1$ μ(mol) | (B)*$^2$ (μmol) | (C) TIBA (mmol) | | | | | |
| Example 88 | ZC 3 | AN 4 | 0.6 | 400 | 7 | 90 | 90 | 85.6 |
| Example 89 | ZC 10 | F 10 | 0.6 | 200 | 10 | 50 | 60 | 37.3 |
| Example 90 | ZM 15 | AN 15 | 0.6 | 200 | 5 | 50 | 60 | 41.6 |
| Example 91 | ZC 25 | AN 25 | 0.6 | 200 | 3 | 50 | 30 | 8.9 |
| Example 92 | ZC 20 | AN 20 | 0.6 | 200 | 3 | 50 | 60 | 15.3 |
| Example 93 | ZC 15 | AN 15 | 0.6 | 200 | 5 | 50 | 30 | 10.4 |
| Comp. Ex. 11 | — | — | — | 130 | 3 | 40 | 180 | 14.6 |
| Example 94 | ZC 25 | AN 25 | 0.6 | 200 | 2 | 50 | 30 | 8.3 |

*$^1$: ZM . . . bis (cyclopentadienyl) dimethyl zirconium
ZC . . . bis (cyclopentadienyl) dichlorozirconium
*$^2$: F . . . ferroceniumtetra (pentafluorophenyl) borate
AN . . . dimethylanilinium tetra (pentafluorophenyl) borate

TABLE 4

| Copolymers | | | | | | | | |
|---|---|---|---|---|---|---|---|---|
| | Norbornene Content (mol %) | [η] (dl/g) | Crystallization Degree (%) | Tg (°C.) | Mw | Mn | Molecular Weight Distribution Mw/Mn | Tm (°C.) |
| Example 88 | 8.5 | 1.56 | 1.5 | 3 | 86900 | 45300 | 1.91 | 75 |
| Example 89 | 4.3 | 3.61 | 26 | −7 | 210000 | 105000 | 2.00 | 86 |
| Example 90 | 8.5 | 2.71 | 13 | 4 | 137000 | 73800 | 1.85 | 77 |
| Example 91 | 16.4 | 1.00 | 0.8 | 14 | 57500 | 35000 | 1.64 | 26 |
| Example 92 | 12.5 | 1.23 | 0.9 | 11 | 72600 | 42100 | 1.73 | 31 |
| Example 93 | 8.8 | 2.19 | 11 | 5 | 129000 | 72700 | 1.78 | 69 |
| Comp. Ex. 11 | 9.4 | 1.18 | 2.0 | 1 | 348000 | 109000 | 3.20 | 100 |
| Example 94 | 24.6 | 1.21 | 0 | 50 | 357000 | 83900 | 4.26 | — |

| Sheets | | | | | | |
|---|---|---|---|---|---|---|
| | Tensile Modulus (Kg/cm$^2$) | Tensile Strength at Break (Kg/cm$^2$) | Elongation at Break (%) | Elastic Recovery (%) | All Light Transmittance (%) | Haze (%) |
| Example 88 | 329 | 354 | 441 | 84 | 94 | 3.3 |
| Example 89 | 881 | 452 | 468 | 35 | 94 | 3.7 |
| Example 90 | 452 | 431 | 453 | 66 | 95 | 3.0 |
| Example 91 | 365 | 358 | 448 | 93 | 95 | 2.8 |
| Example 92 | 300 | 276 | 411 | 94 | 95 | 2.7 |
| Example 93 | 355 | 376 | 418 | 78 | 95 | 3.0 |
| Comp. Ex. 11 | 3800 | 289 | 290 | 5 | 90 | 12.3 |
| Example 94 | 23900 | 490 | 2.3 | Unable to Measure | 93 | 3.0 |

(2) Modling of Sheet:

The procedures of Step (3) of Example 88 were repeated using the copolymer obtained in Step (1) above. The resusts are as shown in Table 4.

Examples 90 to 94

(1) Preparation of Catalyst and
(2) Copolymerization of Ethylene and Norbornene:

Example 95

(1) Preparation of Ferrocenium Tetrakis(pentafluorophenyl) borate:

Ferrocenium tetrakis(pentafluorophenyl)borate was prepared in the same manner as in Example 15.

(2) Copolymerization of Norbornene and Ethylene:

In a 30 litter autoclave, in a nitrogen atmosphere at room temperature, 15 liters of toluene, 23 mmol of triisobutylaluminum (TIBA), 0.11 mmol of bis(cyclopentadienyl) dichlorozirconium, and 0.15 mmol of ferrocenium tetrakis (pentafluorophenyl)borate obtained in Step (1) above, were charred in this order. Then, 2.25 litters of a 70 wt. % toluene solution containing 15.0 mol of norbornene was added to the reaction mixture. After the reaction mixture was heated to 90° C., the polymerization was carried out for 110 minutes while continuously introducing ethylene so as to keep the ethylene partial pressure to 7 Kg/cm$^2$.

After completion of the reaction, the polymer solution was placed into 15 liters of methanol to precipitate a polymer. The polymer was recovered by filtration, and dried, to obtain a cyclic olefin based copolymer (a1).

The yield of the cyclic olefin based copolymer (a1) was 3.48 Kg. The polymerization activity was 347 Kg/gZr.

The obtained cyclic olefin based copolymer (a1) had a norbornene content of 9.2 mol %; an intrinsic viscosity of 0.99 dl/g; a crystallization degree of 1.0%; a glass transition temperature (Tg) of 3° C.; a weight average molecular weight (Mw) of 54,200; a number average molecular weight (Mn) of 28,500; a molecular weight distribution of 1.91; and a melting point of 73° C. (broad peak).

Example 96

To 100 parts by weight of a pulverized product of the cyclic olefin copolymer (a1) obtained in Example 95, 1.05 parts by weight of diatomaceous earth as anti-blocking agent, 0.25 parts by weight of elucic acid amide as lubricant, 10.7 parts by weight of L-LDPE as alpha-olefin based polymer (0438N: Manufactured by Idemitsu petrochemical; MI=4 g/10 min.; D=0.920 g/cm$^3$), were added and mixed. The mixture was supplied to a 50 mm Øuniaxial extruder. The mixture was extruded by a circular die with a diameter of 100 mm and a gap of 3 mm at 160° C., and then subjected to inflation molding to obtain a film having a thickness of 20 micrometers and a width of a folded portion of 340 mm. The extruding rate was 7 Kg/hr and the pulling rate was 6.0 m/min. The moldability was excellent.

The physical properties such as tensile properties and elastic recovery property, and optical properties of the film obtained were measured, and are as shown in Table 5.

In addition, the measurement methods were completely the same through the following Examples.

Example 97

The procedures of Example 95 were repeated except that in Step (2) of Example 95, the amount of bis (cyclopentadienyl)dichlorozirconium used was changed to 0.075 mmol and the amount of norbornene used was changed to 7.5 mol, to obtain a cyclic olefin copolymer (a2).

The yield of the cyclic olefin copolymer (a2) was 2.93 Kg. The polymerization activity was 428 Kg/gZr, The obtained cyclic olefin copolymer (a2) had a norbornene content of 4.9 mol %; an intrinsic viscosity of 1.22 dl/g; a glass transition temperature (Tg) of −7° C.; a weight average molecular weight (Mw) of 72,400; a number average molecular weight (Mn) of 36,400; a molecular weight distribution of 1.99; and a melting point (Tm) of 84° C. (broad peak).

Examples 98 to 104

The procedures of Example 96 were repeated except that the kind of components and the amount of the components used were changed as indicated in Table 5. The results of the physical property measurement are also as shown in Table 5.

Example 105

The copolymer obtained in Step (2) of Example 95 were subjected to heat pressing at 190° C. at a pressure of 100 Kg/cm$^2$, to obtain a sheet having a thickness of 0.1 mm. The results of the physical property measurement were as shown in Table 5.

TABLE 5

| | Norbornene Based Copolymer Kind | Component [b] kind | Component [b] Weight (pbw) | Component [c] | Component [c] Weight (pbw) | Moldability | Tensil Modulus (Kg/cm$^2$) | Tensil Strength at Break (Kg/cm$^2$) | Elongation at Break (%) | Elastic Recovery (%) | Haze (%) | Heat Seal Temp. (°C.) |
|---|---|---|---|---|---|---|---|---|---|---|---|---|
| Example 96 | a 1 | *1 *2 | 1.05 0.25 | L-LDPE | 10.7 | good | 510 | 450 | 640 | 83 | 9.4 | 82 |
| Example 98 | a 1 | *1 *2 | 1.05 0.25 | — | — | good | 480 | 460 | 690 | 87 | 4.9 | 78 |
| Example 99 | a 1 | *1 *2 | 0.50 0.10 | L-LDPE | 5.0 | good | 500 | 450 | 650 | 85 | 7.6 | 81 |
| Example 100 | a 1 | *1 *3 | 0.50 0.10 | L-LDPE | 5.0 | good | 470 | 450 | 620 | 80 | 7.2 | 83 |
| Example 101 | a 1 | *1 *3 | 0.50 0.10 | — | — | good | 450 | 430 | 650 | 87 | 4.0 | 79 |
| Example 102 | a 2 | *4 *2 | 0.50 0.10 | L-LDPE | 5.0 | good | 880 | 452 | 470 | 59 | 9.7 | 91 |
| Example 103 | a 2 | *4 *2 | 0.50 0.10 | — | — | good | 820 | 470 | 490 | 62 | 4.5 | 89 |
| Example 104 | a 1 | — | — | — | — | poor | Inflation films could not be stably prepared. | | | | | |
| Example 105 | a 1 | | | | | | 561 | 560 | 602 | 70 | 3.0 | 78 |

*1: Diatomaceous earth
*2: Erucic acid amide
*3: Stearic acid
*4: Silica

Example 106

To 100 parts by weight of a pulverized product of the cyclic olefin copolymer (a1) obtained in Example 95, 0.2 parts by weight of diatomaceous earth as anti-blocking agent, and 0.05 parts by weight of elucic acid amide as lubricant, were added and mixed. The mixture was supplied to a 50 mm Øuniaxial extruder. The mixture was extruded by a circular die with a diameter of 100 mm and a gap of 3 mm at 160° C., and then subjected to inflation molding to obtain a wrapping film having a thickness of 15 micrometers and a width of a folded portion of 450 mm. The extruding rate was 7 Kg/hr and the pulling rate was 12 m/min. The moldability was excellent.

The physical properties such as tensile properties, elastic recovery property and gas permeability, and optical properteis of the film obtained were measured, and are as shown in Table 6 or 7.

Examples 107 to 110 and Comparative Examples 12 to 14

The procedures of Example 106 were repeated except that the kind of components and the amount of the components used were changed as indicated in Table 6. The results of the physical property measurement are as shown in Table 6 or 7.

Example 111

The procedures of Example 95 were repeated except that in Step (2) of Example 95, the amount of bis (cyclopentadienyl)dichlorozirconium used was changed to 0.064 mmol; the amount of ferrocenium tetrakis (pentafluorophenyl)borate used was changed to 0.11 mmol; the amount of norbornene used was changed to 7.5 mol; the polymerization temperature was changed to 70° C.; and the ethylene partial pressure was changed to 9 Kg/cm$^2$, to obtain a cyclic olefin copolymer (a3).

The yield of the cyclic olefin copolymer (a3) was 2.36 Kg. The polymerization activity was 404 Kg/gZr.

The obtained cyclic olefin copolymer (a3) had a norbornene content of 4.5 mol %; an intrinsic viscosity of 3.07 dl/g; a glass transition temperature (Tg) of −8° C.; a weight average molecular weight (Mw) of 213,000; a number average molecular weight (Mn) of 114,000; a molecular weight distribution of 1.87; and a melting point (T m) of 81° C. (broad peak).

Comparative Example 15

The procedures of Example 95 were repeated except that in Step (2) of Example 95, 300 mmol of ethylaluminum-sesquichloride was used instead of triisobutylaluminum; 30 mmol of VO(OC$_2$H$_5$)Cl$_2$ was used instead of bis (cyclopentadienyl)dichlorozirconium; ferrocenium tetrakis (pentafluorophenyl)borate was not used; the amount of norbornene used was changed to 3 mol; the polymerization

TABLE 6

| | Cyclic Olefin Based Copolymer Kind | Molding Temp. (°C.) | Film Thickness (μ) | Moldability | Tensile Strength (Kg/cm) | Tensile*[4] Modulus (Kg/cm$^2$) | Tensile*[4] Strength at Break (Kg/cm$^2$) | Elongation*[4] at Break (%) | Haze (%) | Elastic Recovery (%) | Heat Seal Temp. (°C.) | Self Adhesiveness | Stabbing Strength (g) |
|---|---|---|---|---|---|---|---|---|---|---|---|---|---|
| Example 106 | a 1 | 160 | 15 | good | 199 | 480 (206) | 460 (718) | 690 (196) | 1.5 | 87 | 78 | o | 240 |
| Example 107 | a 1 | 160 | 40 | good | 205 | 503 (220) | 490 (774) | 710 (191) | 2.3 | 83 | 80 | o | 600 |
| Example 108 | a 1 | 180 | 15 | good | 191 | 489 (210) | 475 (721) | 650 (204) | 1.4 | 85 | 78 | o | 250 |
| Example 109 | a 2 | 160 | 15 | good | 394 | 721 (339) | 518 (818) | 580 (154) | 1.3 | 70 | 84 | o | 310 |
| Example 110 | a 2 | 160 | 40 | good | 408 | 742 (358) | 538 (859) | 555 (155) | 1.6 | 66 | 86 | o | 825 |
| Comp. Ex. 12 | PVC*[1] | — | 14 | — | 78 | 880 (18600) | 330 (661) | 96 (33) | 1.6 | broken | — | o | 96 |
| Comp. Ex. 13 | (MD)*[2] polybutadiene | — | 14 | — | (TD) not 4.4 broken | (MD) 2000 (35400) | 660 (1477) | 51 (23) | 1.3 | broken | — | o | 149 |
| Comp. Ex. 14 | LLDPE*[3] | 160 | 30 | good | 100 | 1400 (12400) | 400 (433) | 500 (194) | 4.6 | −15 | 97 | x | 170 |

*[1]Commerial Product
*[2]Commerial Product
*[3]V-0398CN (manufactured by Idemitsu Petrochemical)
*[4]Results measured at room temperature (−40° C.) are shown.

TABLE 7

| | Oxygen Permeability (ml/m$^2$ · 24 h · atm) | Nitrogen Permeability (ml/m$^2$ · 24 h · atm) | Moisture Permeability (g/m$^2$ · 24 h · atm) |
|---|---|---|---|
| Example 106 | 8600 | 1700 | 28 |
| Example 107 | 3200 | 650 | 14 |
| Example 108 | 8700 | 1600 | 29 |
| Example 109 | 8600 | 1500 | 30 |
| Example 110 | 3400 | 800 | 13 |
| Comp. Ex. 12 | 1700 | 460 | 68 |
| Comp. Ex. 14 | 13200 | 3300 | 26 | temperature was changed to 30° C.; the ethylene partial pressure was changed to 1 Kg/cm$^2$; and the polymerization time was changed to 30 minutes, to obtain a cyclic olefin copolymer (a4).

The yield of the cyclic olefin copolymer (a4) was 480 g.

The obtained cyclic olefin copolymer (a4) had a norbornene content of 24.6 mol %; an intrinsic viscosity of 1.21 dl/g; a glass transition temperature (Tg) of 50° C.; a molecular weight distribution of 4.26; and a melting point (Tm) of 100° C. (sharp peak).

Examples 112 to 116 and Comparative Examples 16 and 17

As indicated in Table 8, pellets prepared from the cyclic olefin copolymers (a1) to (a4) obtained in Examples 95, 97 and 111 and Comparative Example 15, or resin compositions containing the copolymer (a1), (a2), (a3) or (a4) and a thermoplastic resin, were subjected to injection molding using an injection molding equipment (IS25EP: Manufactured by Toshiba) at a setting temperature of 150° C., at a mold temperature of 30° C., an injection pressure (first/ second) of 80/40 Kg/cm$^2$, to obtain a molded article (70 mm×70 mm×2 mm).

The physical properties such as tensile properties and molding shrinkage factor, and optical properties of the molded articles obtained, were measured, and are as shown in Table 8.

The obtained copolymer had a weight average molecular weight (Mw) of 1,210,000 and a molecular weight distribution of 2.37.

Reference Example 1

The procedures of Example 13 were repeated except that 2.0 mmol of methylaluminoxane was employed istead of triisobutylaluminum, and triethylammonium tetrakis (pentafluorophenyl)borate was not used, to obtain 0.96 g of a copolymer. The polymerization activity was 1.05 Kg/gZr.

The obtained copolymer had a norbornene content of 11.5 mol %; and an intrinsic viscosity of 2.32 dl/g.

Reference Example 2

The procedures of Example 27 were repeated except that 3.0 mmol of methylaluminoxane was employed instead of triisobutylaluminum, and ferrocenium tetrakis (pentafluorophenyl)borate was not employed, to obtain 10.4 g of a copolymer. The polymerization activity was 7.6 Kg/gZr.

The obtained copolymer had a norbornene content of 8.5 mol %; and an intrinsic viscosity of 2.19 dl/g.

Example 118

The procedures of Example 16 were repeated except that 0.03 mmol of dimethylanilinium tetrakis (pentafluorophenyl)borate was employed instead of ferroce-

TABLE 8

| | Cyclic Olefin Based Copolymer | Thermoplastic Resin | Amount Used (pbw) | tensile Strength at Break (Kg/cm$^2$) | Tensile Modulus (Kg/cm$^2$) | Elongation at Break (%) | Izod Notched Impact Strength (Kgcm/cm) |
|---|---|---|---|---|---|---|---|
| Example 112 | a 1 | — | — | 360 | 490 | 440 | NB*$^4$ |
| Example 113 | a 2 | — | — | 420 | 760 | 530 | NB |
| Example 114 | a 3 | — | — | 440 | 840 | 510 | NB |
| Example 115 | a 1 | L-LDPE*$^1$ | 10 | 380 | 540 | 430 | NB |
| Example 116 | a 1 | IPP*$^2$ | 10 | 390 | 580 | 400 | NB |
| Comp. Ex. 16 | — | TPO*$^3$ | — | 310 | 3300 | 870 | NB |
| Comp. Ex. 17 | a 4 | — | — | 580 | 25000 | 6 | 8 |

| | Izod Unnotched Impact Strength (Kgcm/cm) | Molding Shrinkage Factor (length direction) | Molding Shrinkage Factor (width direction) | Olzen Stiffness (Kg/cm$^2$) | Shore Hardness (D) | All Light Transmittance (%) | Haze (%) |
|---|---|---|---|---|---|---|---|
| Example 112 | NB | 0.35 | 1.33 | 205 | 46 | 92.2 | 4.5 |
| Example 113 | NB | 0.27 | 0.77 | 220 | 48 | 93.8 | 4.2 |
| Example 114 | NB | 0.47 | 0.98 | 235 | 51 | 91.0 | 5.3 |
| Example 115 | NB | 0.91 | 1.25 | 260 | 55 | 90.7 | 11 |
| Example 116 | NB | 1.32 | 1.48 | 280 | 59 | 89.3 | 14 |
| Comp. Ex. 16 | NB | 1.41 | 1.28 | 195 | 62 | 28.1 | 90 |
| Comp. Ex. 17 | 70 | 0.5 | 0.7 | 2500 | 99 | 86.6 | 15 |

*$^1$Linear low density polyethylene (V-0398CN manufactured by Idemitsu Petrochemical)
*$^2$Polypropylene (Manufactured by Idemitsu Petrochemical)
*$^3$Olefin based thermoplastic elastomer (SP × 9800 Manufactured by Mitsubishi Yuka)
*$^4$Not Broken Example 117

A 500 ml glass vessel was charged with 30 ml of dried toluene, 5 mmol of triisobutylaluminum, 25 micromoles of nickel bis(acetylacetonate), 25 micromoles of dimethylanilinium tetrakis(pentafluorophenyl)borate and 500 mmol of norbornene. The polymerization was carried out at 50° C. for 1 hour, to obtain 9.58 g of a polymer. The polymerization activity was 6.53 Kg/gNi.

nium tetrakis(pentafluorophenyl)borate, to obtain 26.4 g of a copolymer. The polymerization activity was 10 Kg/gZr.

Figure 5:
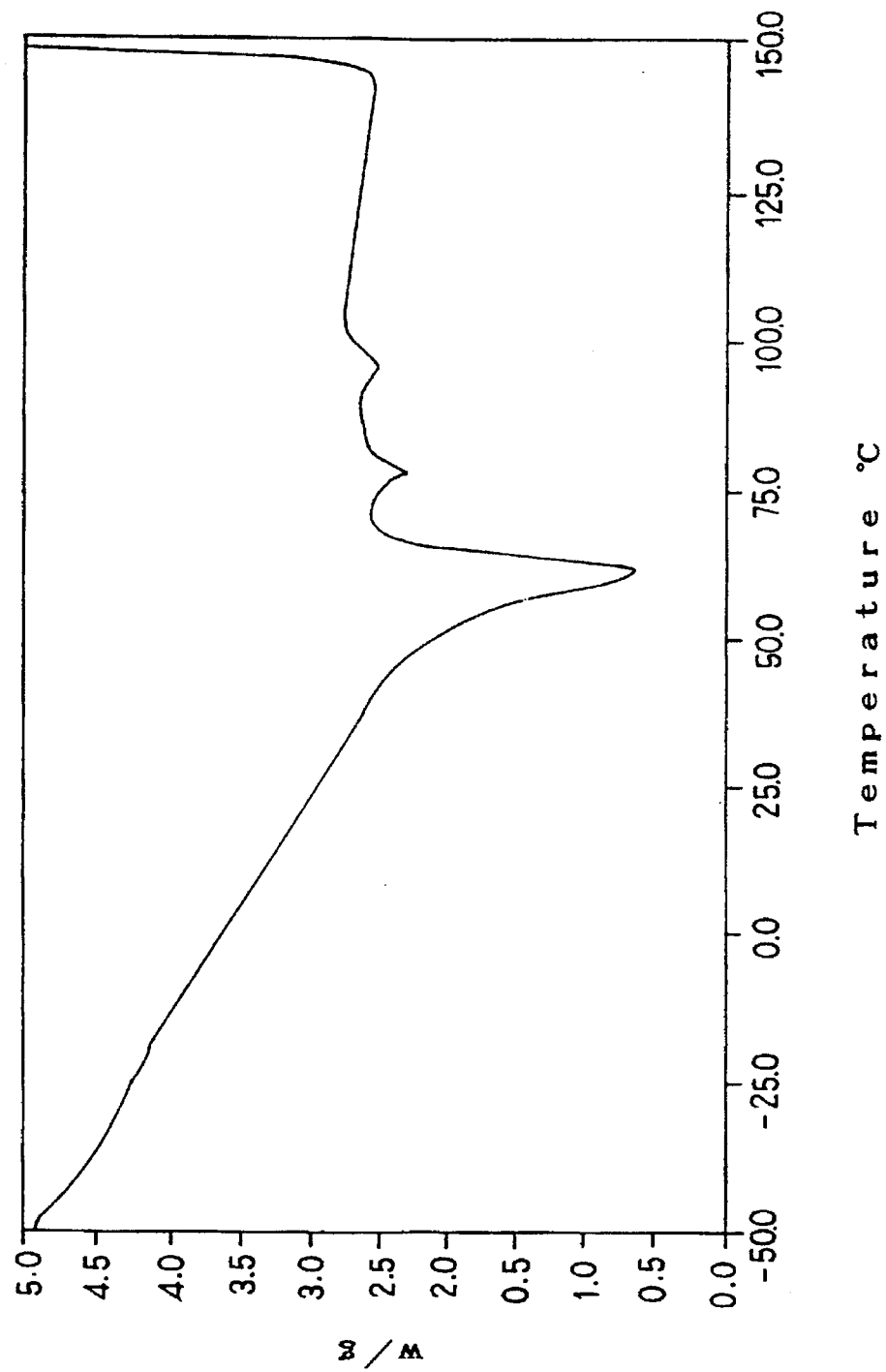
FIG. 5 is the DSC chart (heat down stage) of the copolymer obtained in Example 118.

The obtained copolymer had a norbornene content of 7.0 mol %; and an intrinsic viscosity of 3.94 dl/g. The DSC measurement (temperature decrease) was made. The results are as shown in FIG. 5.

Comparative Example 18

The procedures of Comparative Example 11 were repeated except that the ethylene pressure was changed to 7 Kg/cm², to obtain 35.9 g of a copolymer. The polymerization activity was 0.88 Kg/gZr.

Figure 6:
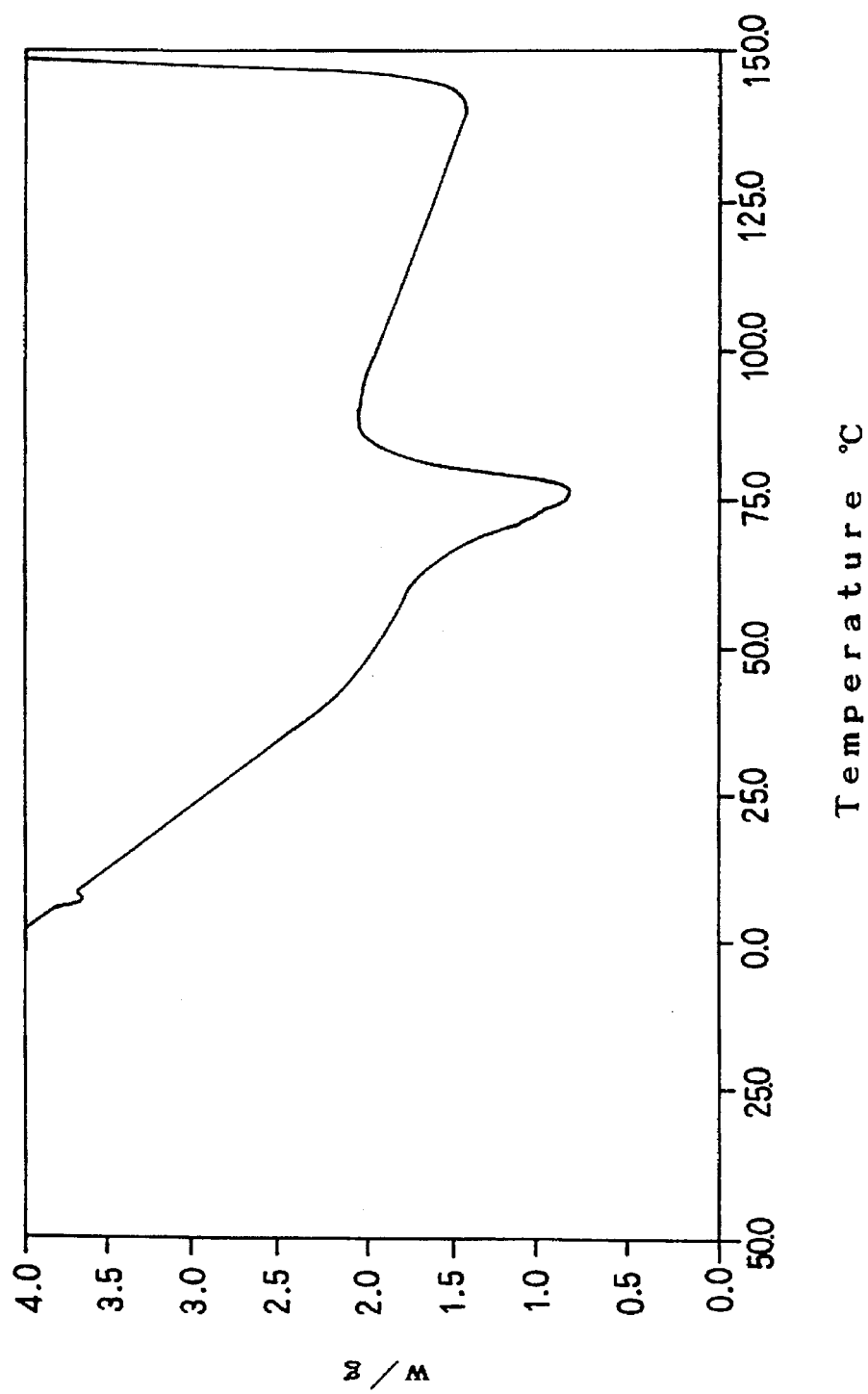
FIG. 6 is the DSC chart (heat down stage) of the copolymer obtained in Comparative Example 18.

The obtained copolymer had a norbornene content of 6.8 mol %; and an intrinsic viscosity of 3.28 dl/g. The DSC measurement (heat down stage) was made. The results are as shown in FIG. 6.

Example 119

The procedures of Example 46 were repeated except that 0.002 mmol of (3,5-dimethylphenoxy)trichlorozirconium was used instead of bis(cyclopentadienyl) dihydridezirconium, to obtain 53.7 g of a copolymer. The polymerization activity was 295 Kg/gZr.

The obtained copolymer had a norbornene content of 4.9 mol %; and an intrinsic viscosity of 1.88 dl/g.

Industrial Applicability

As described above, according to the process of the present invention, a cyclic homopolymer or a cyclic olefin/alpha-olefin copolymer can be effectively produced without opening the rings of the cyclic olefin and without using a great amount of organometalic compounds.

The cyclic olefin copolymers (I) of the present invention are superior in heat resistance, transparency, strength and hardness, and thus can be effectively used in an optical, medical and food field or the like.

The cyclic olefin copolymers (II) of the present invention have a good elongation recovery property, good transparency, suitable elasticity and well-balanced physical properties, and thus can be effectively used as materials for films, sheets and other various molded articles in a packaging, medical and agricultural field or the like.

Furthermore, the cyclic olefin copolymer compositions of the present invention can be employed in various applications such as a sealant film, pallet stretch film, wrapping film for industry use, films for agricultrual use, wrapping films for meat, shrink films, coating materials, damping materials, pipes, packages for transfusion liquids and toys because of their superiority in transparency, an elongation recovery property, adhesiveness, stabbing strength, tear strength, weatherability, low temperature heat sealability, heat seal strength, a shape memory property, a dielectric property and the like. In particular, in the case Of molding the cyclic olefin copolymer composition into films or sheets, the obtained films and sheets will tend not to generate blocking and will have a good elongation recovery property, transparency and adhesiveness. Thus, the sheets and films can be effectively employed in various fields such as packaging, medical and agricultural fields.

What is claimed is:

1. A molded article prepared from a cyclic olefin copolymer having the monomer components of:

(1) 80 to 99.9 mol % of the repeating unit [X]:

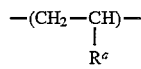  [X]

wherein $R^a$ is hydrogen or a $C_{1-20}$ hydrocarbon group; and (2) 0.1 to 20 mol % of the repeating unit [Y]:

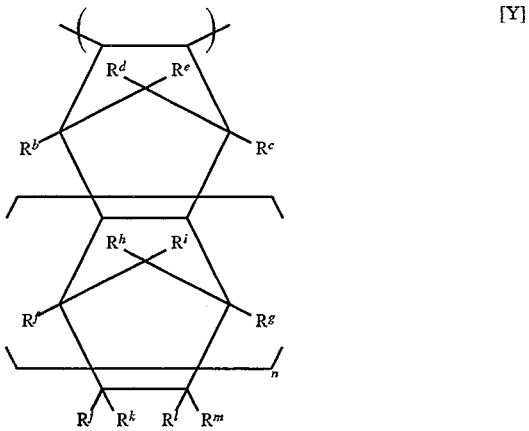  [Y]

wherein $R^b$ to $R^m$, which may be the same or different from each other, are each independently hydrogen, a $C_{1-20}$ hydrocarbon group or a substituent having a halogen atom, oxygen atom or nitrogen atom; $R^j$ or $R^k$ and $R^l$ or $R^m$ may form a ring together, and n is 0 or an integer value;

said cyclic olefin copolymer (1) having an elastic recovery property of at least 30%, as a sheet prepared by molding the copolymer, (2) an intrinsic viscosity of 0.01 to 20 dl/g, (3) a glass transition temperature of less than 30° C., and (4) a tensile modulus of less than 2,000 kg/cm², as determined by measurement at room temperature.

2. The molded article according to claim 1, wherein $R^a$ in the repeating unit [X] is hydrogen, $R^b$ to $R^e$ in the repeating unit [Y] are each independently hydrogen and n in the repeating unit [Y] is 0.

3. The molded article according to claim 1, wherein a molded article is formed in the shape of film or sheet.

4. The molded article according to claim 2, wherein a molded article is formed in the shape of film or sheet.

5. The molded article according to claim 1, wherein a molded article is formed in the shape of wrapping film.

6. The molded article according to claim 2, wherein a molded article is formed in the shape of wrapping film.

7. The molded article according to claim 1, wherein a molded article is formed with a mold.

8. The molded article according to claim 2, wherein a molded article is formed with a mold.

9. A cyclic olefin copolymer composition comprising:

(a) 100 parts by weight of a cyclic olefin copolymer having the monomer components of:

(1) 80 to 99.9 mol % of the repeating unit [X]:

  [X]

wherein $R^a$ is hydrogen or a $C_{1-20}$ hydrocarbon group; and (2) 0.1 to 20 mol % of the repeating unit [Y]:

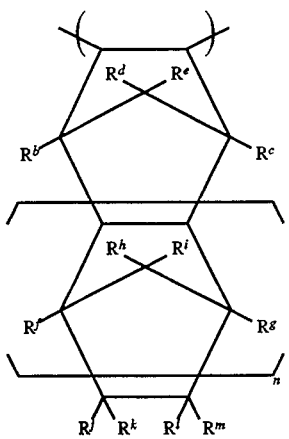
[Y]

wherein $R^b$ to $R^m$, which may be the same or different from each other, are each independently hydrogen, a $C_{1-20}$ hydrocarbon group or a substituent having a halogen atom, oxygen atom or nitrogen atom; $R^j$ or $R^k$ and $R^l$ or $R^m$ may form a ring together, and n is 0 or an integer value;

said cyclic olefin copolymer (1) having an elastic recovery property of at least 30%, as a sheet prepared by molding the copolymer (2) an intrinsic viscosity of 0.01 to 20 dl/g, (3) a glass transition temperature of less than 30° C., and (4) a tensile modulus of less than 2,000 kg/cm², as determined by measurement at room temperature; and (b) 0.01 to 10 parts by weight of an anti-blocking agent, a lubricant, or a combination thereof.

10. A film or sheet comprising the cyclic olefin copolymer composition of claim 9.

11. A cyclic olefin copolymer composition comprising:

(a) 100 parts by weight of a cyclic olefin copolymer having the monomer components of:

(1) 80 to 99.9 mol % of the repeating unit [X]:

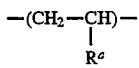
[X]

wherein $R^a$ is hydrogen; and (2) 0.1 to 20 mol % of the repeating unit [Y]:

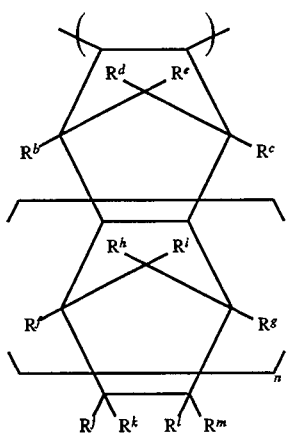
[Y]

wherein $R^b$ to $R^e$ are each hydrogen and n is 0;

said cyclic olefin copolymer having (1) an elastic recovery property of at least 30%, as a sheet prepared by molding the copolymer, (2) an intrinsic viscosity of 0.01 to 20 dl/g, (3) a glass transition temperature of less than 30° C., and (4) a tensile modulus of less than 2,000 kg/cm², as determined by measurement at room temperature, and (b) 0.01 to 10 parts by weight of an anti-blocking agent, a lubricant or a combination thereof.

12. A film or sheet comprising the cyclic olefin copolymer composition of claim 11.

13. A cyclic olefin copolymer composition comprising:

(a) 100 parts by weight of a cyclic olefin copolymer having the monomer components of:

(1) 80 to 99.9 mol % of the repeating unit [X]:

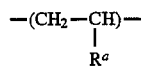
[X]

wherein $R^a$ is hydrogen or a $C_{1-20}$ hydrocarbon group; and (2) 0.1 to 20 mol % of the repeating unit [Y]:

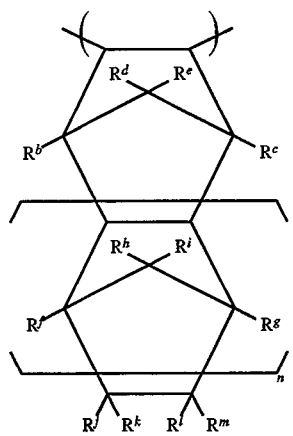
[Y]

wherein $R^b$ to $R^m$, which may be the same or different from each other, are each independently hydrogen, a $C_{1-20}$ hydrocarbon group or a substituent having a halogen atom, oxygen or nitrogen atom; $R^j$ or $R^k$ and $R^l$ or $R^m$ may form a ring together, and n is 0 or an integer value;

said cyclic olefin copolymer (1) having an elastic recovery property of at least 30%, as a sheet prepared by molding the copolymer, (2) an intrinsic viscosity of 0.01 to 20 dl/g, (3) a glass transition temperature of less than 30° C., and (4) a tensile modulus of less than 2,000 kg/cm², as determined by measurement at room temperature; and (b) 0.01 to 10 parts by weight of an anti-blocking agent, a lubricant or a combination thereof; and (c) 1 to 100 parts by weight of an α-olefin based polymer, wherein the α-olefin has at least two carbon atoms.

14. A film or sheet comprising a cyclic olefin copolymer composition of claim 13.

15. A cyclic olefin copolymer composition comprising:

(a) 100 parts by weight of a cyclic olefin copolymer having the monomer components of:

(1) 80 to 99.9 mol % of the repeating unit [X]:

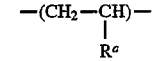
[X]

wherein $R^a$ is hydrogen and (2) 0.1 to 20 mol % of the repeating unit [Y]:

[Y] 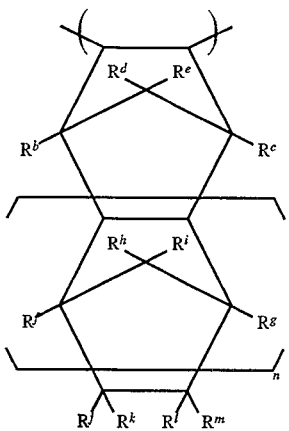

wherein $R^b$ to $R^e$ are each hydrogen and n is 0;

said cyclic olefin copolymer (1) having an elastic recovery property of at least 30%, as a sheet prepared by molding the copolymer, (2) an intrinsic viscosity of 0.01 to 20 dl/g, (3) a glass transition temperature of less than 30° C., and (4) a tensile modulus of less than 2,000 kg/cm², as determined by measurement at room temperature;

(b) 0.01 to 10 parts by weight of an anti-blocking agent, a lubricant, or a combination thereof; and (c) 1 to 100 parts by weight of an α-olefin based polymer, wherein the α-olefin has at least two carbon atoms.

16. A film or sheet comprising a cyclic olefin copolymer composition of claim 15.

* * * * *